United States Patent [19]

Maeda et al.

[11] Patent Number: 5,182,741
[45] Date of Patent: Jan. 26, 1993

[54] OPTICAL DISK RECORDING/REPRODUCING DEVICE UTILIZING A CONSTANT ANGULAR VELOCITY METHOD WITH A CONSTANT LINEAR VELOCITY FORMATTED OPTICAL DISK

[75] Inventors: Shigemi Maeda, Yamatokoriyama; Toshihisa Deguchi, Nara; Shigeo Terashima, Tenri, all of Japan

[73] Assignee: Sharp Kabushiki Kaisha, Osaka, Japan

[21] Appl. No.: 568,483

[22] Filed: Aug. 16, 1990

[30] Foreign Application Priority Data

Aug. 25, 1989 [JP] Japan .................. 1-219314
Aug. 25, 1989 [JP] Japan .................. 1-219315

[51] Int. Cl.⁵ .................................. G11B 7/00
[52] U.S. Cl. .................................. 369/50; 369/133; 369/240; 369/58
[58] Field of Search ............ 369/32, 50, 133, 240, 369/53-59

[56] References Cited

U.S. PATENT DOCUMENTS

| | | | |
|---|---|---|---|
| 4,190,860 | 2/1980 | Somers et al. | 369/249 X |
| 4,228,326 | 10/1980 | Dakin et al. | 369/50 X |
| 4,761,775 | 8/1988 | Murakami | 369/46 |
| 4,766,502 | 8/1988 | Mashimo | 358/322 |
| 4,907,216 | 3/1990 | Rijnsburger | 369/275 |
| 4,918,677 | 4/1990 | Ashinuma et al. | 369/59 X |
| 5,063,552 | 11/1991 | Shigemori | 369/50 |

FOREIGN PATENT DOCUMENTS

| | | |
|---|---|---|
| 0158067 | 10/1985 | European Pat. Off. |
| 0265695 | 5/1988 | European Pat. Off. |
| 0273384 | 7/1988 | European Pat. Off. |
| 0299573 | 1/1989 | European Pat. Off. |
| 63-205819 | 12/1988 | Japan |
| 64-39632 | 2/1989 | Japan |
| WO8804824 | 6/1988 | PCT Int'l Appl. |

OTHER PUBLICATIONS

Zukai Compact Disk Dokuhon (Illustrative Compact Disk Handbook) Date of Issue: The second edition Apr. 25, 1988.

The English Abstract of Japanese No. 63-222379; Sony Corp.

The Art of Digital Audio; John Watkinson; Jan. 1988; p. 1 and pp. 441 to 487.

*Primary Examiner*—Robert L. Richardson

[57] ABSTRACT

An optical disk recording/reproducing device for recording or reproducing information on or from an optical disk while rotatively driving the optical disk at a constant angular velocity. The disk has pre-recorded information cyclically formed along a track so as to provide rotation control at a constant linear velocity. The device, which includes a clock generating circuit for generating a clock signal for recording or reproducing in accordance with a recording frequency of the pre-recorded information derived from signals reproduced by an optical head, is designed to perform recording or reproducing operations with a recording frequency according to the clock signal. The device further includes a magnetic filed control circuit and a recording light power control circuit whereby a magnetic field and light power to be applied to the optical disk is varied according to the recording frequency during recording operations.

32 Claims, 19 Drawing Sheets

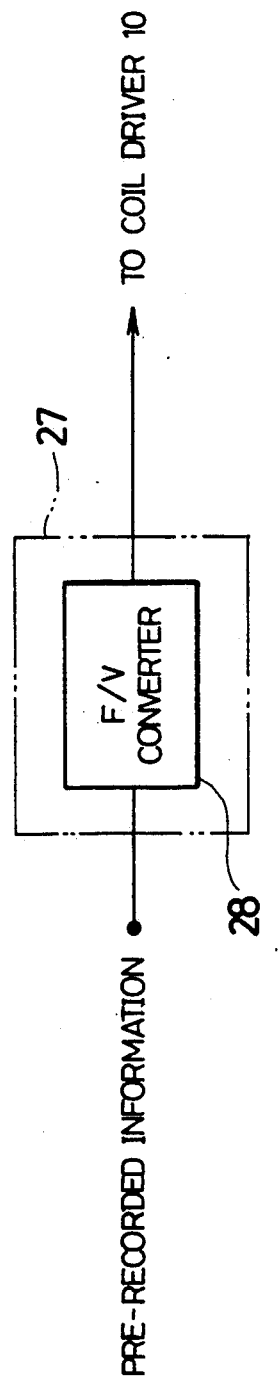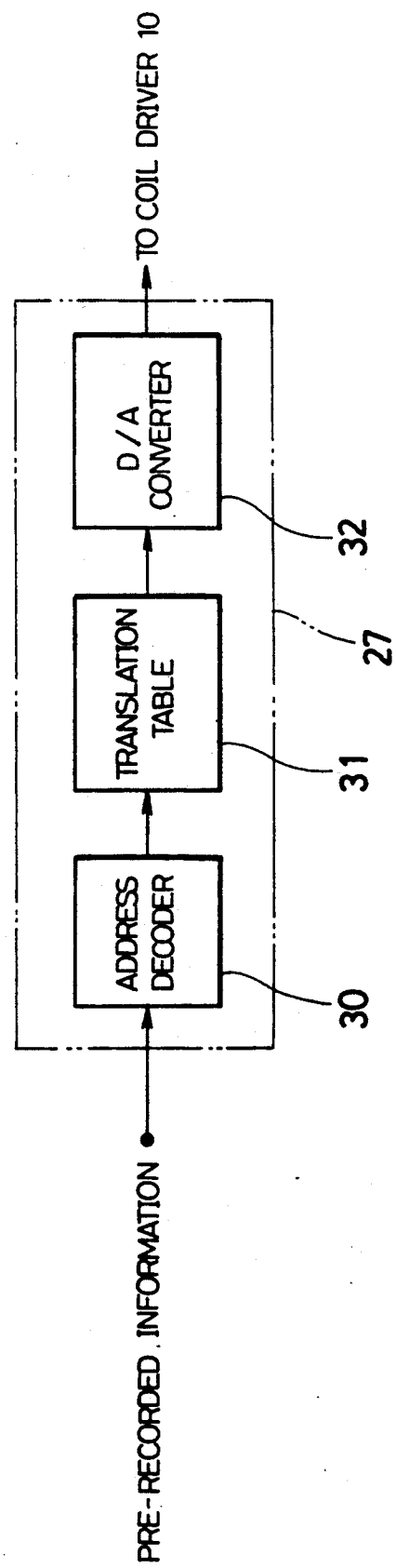

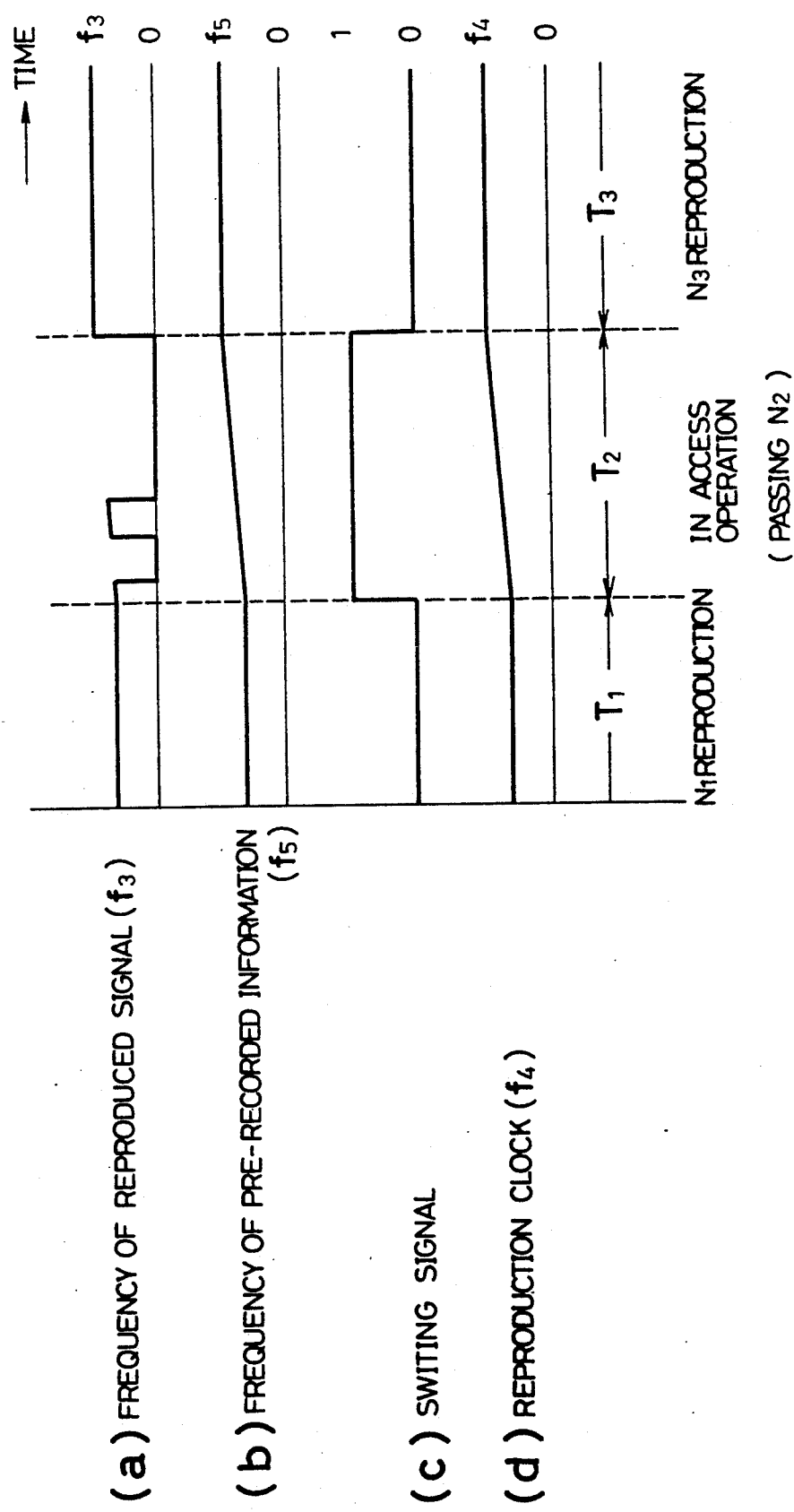

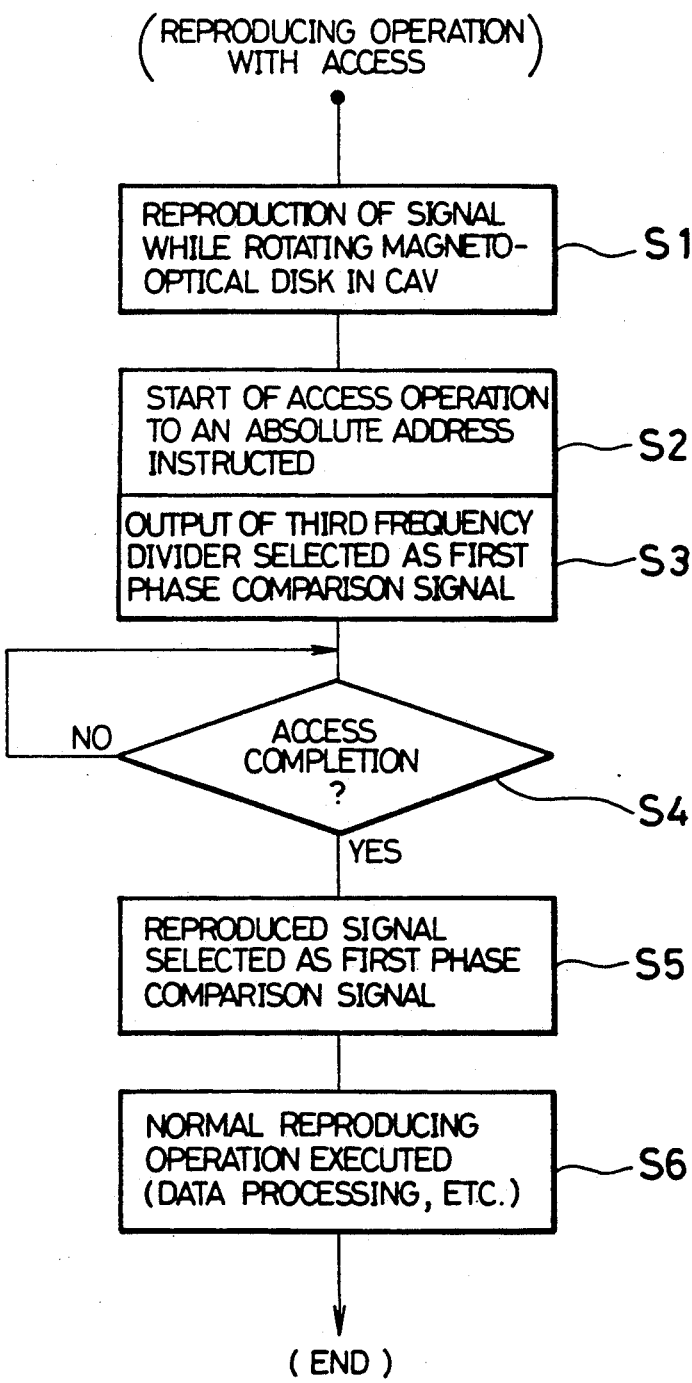

OPTICAL DISK RECORDING/REPRODUCING DEVICE UTILIZING A CONSTANT ANGULAR VELOCITY METHOD WITH A CONSTANT LINEAR VELOCITY FORMATTED OPTICAL DISK

FIELD OF THE INVENTION

The present invention relates to an optical disk recording/reproducing device which records various information on a recordable optical disk of a so-called DRAW (Direct Read After Write) type, re-writable type, or the like, and reproduces from an optical disk of a read-only type, DRAW type, re-writable type, or the like. More specifically, the present invention relates to the optical disk recording/reproducing device which performs recording and/or reproducing operations with rotation control by constant angular velocity on and/or from an optical disk having pre-recorded information provided thereon so as to permit the rotation control by the constant linear velocity.

BACKGROUND OF THE INVENTION

Conventionally, there are widely used so-called compact disks (hereinafter called CD) wherein music information or other information is recorded as digital signals by the use of pits formed thereon. The reproduction from those CD's is performed by optical disk reproducing devices dedicated to reproduction.

Normally, there are pieces of information successively recorded on the CD's, and in reproduction, a reproducing operation such as successive reproduction or selective reproduction is performed with respect to a desired piece of information by collating absolute addresses predeterminately recorded on the disk with an absolute address indicating a recording start position of the piece of desired information, recorded in a TOC (Table Of Contents) area disposed at the innermost section on the disk.

Meanwhile, in recent years, magneto-optical disks as optical disks capable of recording, reproducing and erasing operations, which will take the place of optical disks such as CD's used only for reproduction, have been widely developed. In those magneto-optical disks, a thin magnetic film having vertical magnetic anisotoropy is usually used as a recording medium, and a laser beam which is focused to a spot of substantial 1 μm is applied thereto in order to perform recording, reproducing and erasing operations. More specifically, the recording and erasing operations are achieved by effecting magnetization reversal by an external magnetic field by utilizing the fact that a coercive force is lowered because of a temperature rise in the spot where the laser beam is focused. On the other hand, the reproducing operation is achieved by utilizing the fact that a plane of polarization of the laser beam rotates by virtue of magneto-optical effect and by detecting the rotation of the polarizing plane by an analyzer.

For those disks of re-writable type such as magneto-optical disks or those of DRAW type recordable only once, it is desirable to provide an optical disk recording/reproducing device which has a standardized reproduction method with conventional CD's so as to be interchangeably applicable to any of those types in its recording or reproducing operation for music information or the like. In that case, rotation control by so-called constant linear velocity (hereinafter called CLV), which is performed in CD's and wherein relative velocity of an optical head along a track is kept constant, can be adopted for the rotation of optical disks in recording or reproducing operation. Further, conventionally so-called CD-ROM's are provided, wherein various data other than music information are recorded in CD's used only for reproduction, and the CLV control is also adopted for those CD-ROM's.

However, in the CLV control, it is necessary to vary the rotation velocity of a motor depending on positions on the disk in the radius direction, and therefore the rotation control of the motor becomes complicated. Moreover, since the rotation velocity of the motor must be changed when the optical head is shifted in a radius direction to access a desired track of the disk, required access time tends to become longer.

Moreover, in the CLV control, for example, in the case of reproducing information recorded in a CD-ROM and transferring it to an external device, the required reproducing time per one rotation of the disk increases as the relevant position gets closer to the circumferential section, and therefore a problem is presented in that the required reproducing time for the entire region of the disk tends to become longer.

In order to solve the above problems, it is proposed to adopt so-called constant angular velocity (hereinafter called CAV) control, whereby the rotation speed of the motor is kept constant regardless of positions on the disk when information such as data for computers wherein changes of time series are allowed is recorded or reproduced. However, in the CAV method, since a frequency of clock for recording or reproducing is kept constant regardless of positions on the disk, recording density lowers as the relevant position gets closer to the circumferential section, thereby arising the problem that enough recording capacity is not obtained.

For that reason, conventionally, it has been proposed to adopt MCAV (Modified CAV) method which has an increased recording capacity by increasing a recording frequency as the relevant position gets closer to the circumferential section in the CAV control method so as to make the recording density substantially constant regardless of inner sections or outer sections of the disk. When recordings are made by the MCAV method, however, it is necessary to gradually increase the frequency of reproducing clocks as the relevant position gets closer to the circumferential section also in reproducing operations.

In the conventional MCAV method, several kinds of frequency generators are provided, and in recording, a recording frequency generator for generating a suitable recording frequency for a disk area to be recorded therein, is selected among those frequency generators so as to perform the recording operation. In reproduction, one of those frequency generators suitable for a disk area to be reproduced therefrom, and a signal of the frequency generator is used as a reference signal in reproducing operation. In that case, there are a plurality of areas provided on the disk, each corresponding to one of those several kinds of frequencies, and a recording density of each area is kept substantially constant; however, compared with the recording by the CLV method, the equivalent recording density cannot be obtained.

Furthermore, in the case of recordable optical disks such as magneto-optical disks, pre-recorded information such as absolute addresses is predeterminately recorded thereon in an unerasable condition; however, a format whereby the pre-recorded information is recorded is normally different between those disks provided with CLV rotation control and those provided with CAV or MCAV control. Therefore, interchangeability between optical disks of CLV method and those of CAV (MCAV) method has not been achieved.

SUMMARY OF THE INVENTION

It is an object of the present invention to provide an optical disk recording/reproducing device for recording and/or reproducing on and/or from an optical disk with rotation control by constant angular velocity, which disk has pre-recorded information provided thereon so as to permit rotation control by constant linear velocity.

It is another object of the present invention to provide an optical disk recording/reproducing device which may shorten required reproducing time for the entire region of an optical disk.

It is still another object of the present invention to provide an optical disk recording/reproducing device which may improve quality of reproduced signals by improving an S/N ratio in reproducing information recorded by rotation control in constant angular velocity.

It is further object of the present invention to provide an optical disk recording/reproducing device which permits an optical disk fabricated for use in CLV method to be used interchangeably both in CLV method and in MCAV method in accordance with the present invention.

In order to achieve the above objects, an optical disk recording/reproducing device of the present invention, which records and/or reproduces information on and/or from an optical disk wherein pre-recorded information is cyclically provided along a track so as to permit rotation control by constant linear velocity for the entire region thereof, comprises: driving means for rotatively driving the optical disk at a constant angular velocity; reproducing means for reproducing signals recorded on the optical disk; reference signal generation means for generating a reference signal according to a recording frequency of the pre-recorded information in the signals reproduced by the reproducing means; and recording means for performing a recording operation by using a frequency for recording in accordance with the reference signal generated by the reference signal generation means.

Moreover, it is preferable to provide a second reference signal generation means for determining recording conditions including at least either light power for recording or intensity of magnetic field for recording, according to the pre-recorded information in the signals reproduced by the reproducing means and recording condition setting means for determining recording conditions according to the second reference signal from the second reference signal generation means and for releasing them to the recording means.

With the above arrangement, since the optical disk, which has pre-recorded information such as absolute addresses provided thereon so as to permit rotation control by constant linear velocity (CLV), is rotated at a constant angular velocity (CAV), a recording frequency of the pre-recorded information varies depending on positions on the optical disk in a radius direction. More specifically, since the pre-recorded information is provided so as to permit rotation control by CLV, when the optical disk is rotated normally in CLV, the recording frequency of the pre-recorded information is kept substantially constant regardless of positions on the optical disk. However, since the density (frequency of recording) of the pre-recorded information within a given angular range becomes higher as the relevant position gets closer to the circumferential section of the optical disk when the optical disk is rotated at a CAV, the recording frequency of the pre-recorded information becomes higher as the relevant position gets closer to the circumferential section of the optical disk.

On the other hand, in the MCAV method, since a frequency for recording becomes higher as the relevant position gets closer to the circumferential section of the optical disk, it is proposed to generate a reference signal such as a recording clock according to the recording frequency of the pre-recorded information, and to perform recording operation using a frequency for recording in response to the reference signal. Thus, by making the recording density on the optical disk constant regardless of the inner sections or outer sections on the optical disk, the recording operation by MCAV method is performed. In that case, since the frequency for recording is determined according to the pre-recorded information predeterminately recorded on the optical disk, it may be set accurately, and the recording density is kept constant regardless of positions on the optical disk.

Moreover, as aforementioned, by generating the reference signal such as the reproduction clock according to the recording frequency of the pre-recorded information, the arrangement makes it possible to generate an accurate reference signal whose frequency becomes higher as the relevant position gets closer to the circumferential section of the disk.

Further, in the arrangement, since recording and/or reproducing operations are performed in MCAV method while rotating the optical disk at a constant angular velocity (CAV), which disk has pre-recorded information provided thereon so as to permit rotation control by constant linear velocity (CLV), one optical disk may be used both in CLV method as its original method and MCAV method in accordance with the present invention, and thus utility value of the optical disk is heightened.

Furthermore, it is proposed to reproduce a CD-ROM in MCAV method, which is fabricated so as to be reproduced in CLV method, and since required reproducing time per one rotation of the disk is kept constant regardless of positions on the optical disk in MCAV method, the required reproducing time for the entire region of the disk may be shortened.

However, in the case of recording information while changing a recording frequency in the MCAV method, it is difficult to obtain even quality of reproduced signals when the recording operation is performed under constant recording conditions, since the linear velocity is different depending on positions on the disk in the radius direction.

Therefore, as aforementioned, by providing the second reference signal generation means for generating a second reference signal to determine recording conditions including at least either light power for recording or intensity of magnetic field for recording, according to the recording frequency of the pre-recorded information and the recording condition setting means for determining recording conditions according to the second reference signal from the second reference signal generation means and for releasing them to the recording means, the recording conditions may be changed in response to the recording frequency of the pre-recorded information (for example, the light power and/or intensity of magnetic field are/is increased as the recording frequency becomes higher.) Thus, the S/N ratio in reproduction may be improved, and consequently quality of the reproduced signals is enhanced.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a flow chart showing a schematic processing sequence in recording operation of an optical disk recording/reproducing device.

FIG. 4 is a block diagram of the optical disk recording/reproducing device.

FIGS. 5 to 8 respectively show an arrangement of a clock generating circuit.

FIGS. 9 to 11 show another embodiment of the present invention.

FIG. 9 is a block diagram of an optical disk recording/reproducing device.

FIGS. 10 and 11 respectively shown an arrangement of a magnetic field control circuit.

FIG. 12 is a block diagram of an optical disk recording/reproducing device.

FIGS. 13 and 14 are block diagrams respectively showing an arrangement of a recording light power control circuit.

FIGS. 15 to 22 show a further embodiment of the present invention.

FIG. 15 is a block diagram showing an internal arrangement of a reproduction clock generating circuit.

FIG. 16 is a block diagram of an optical disk recording/reproducing device.

FIG. 17 is a graph showing a relationship between a position on an optical disk in a radius direction and frequencies of a reproduced signal and pre-recorded information.

FIGS. 18a-18f are a time chart showing transition of each of signals generated from respective sections of the reproduction clock generating circuit before and after an access.

FIG. 19 is a block diagram showing another internal arrangement of a reproduction clock generating circuit.

FIGS. 20a-20c are an explanatory diagram showing recording conditions of information on the optical disk and changes of frequencies of pre-recorded information and a reproduced signal.

FIGS. 21a-21d are a time chart showing transition of each of signals generated from respective sections of the reproduction clock generating circuit before and after an access.

FIG. 22 is a flow chart showing an outlined sequence of control procedures in an access.

DETAILED DESCRIPTION OF THE EMBODIMENTS

The following description will discuss one embodiment of the present invention referring to FIGS. 1 to 8.

Figure 1:
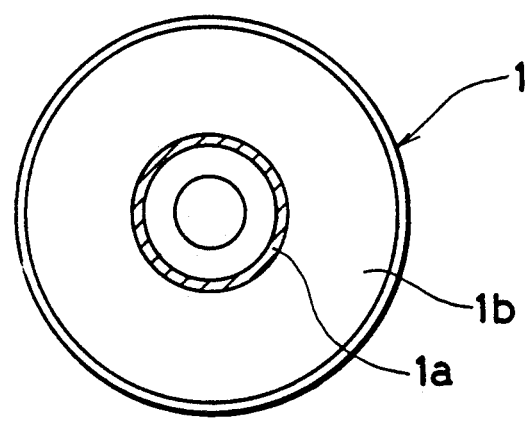
FIG. 1 shows a schematic plan view of an magneto-optical disk.

There is shown a magneto-optical disk 1 in FIG. 1 as an optical disk of a re-writable type, which was fabricated for recording, reproducing and erasing operations originally in a CLV method. The disk 1 is provided with a TOC (Table Of Contents) area 1a at an innermost section thereon, and most of the areas outside of the TOC area 1 form an information recording area 1b. When recording operations are performed on the magneto-optical disk 1 in the CLV method, various kinds of information such as music programs are recorded in the information recording area 1b. On the other hand, when recording operations are performed on the magneto-optical disk 1 in a MCAV method, data such as those for computers are recorded in the information recording area 1b. Moreover, in the TOC area 1a, additional information with respect to each piece of information recorded in the information recording area 1b, including, for example, recording start and end positions of each piece of information is recorded.

Figure 2:
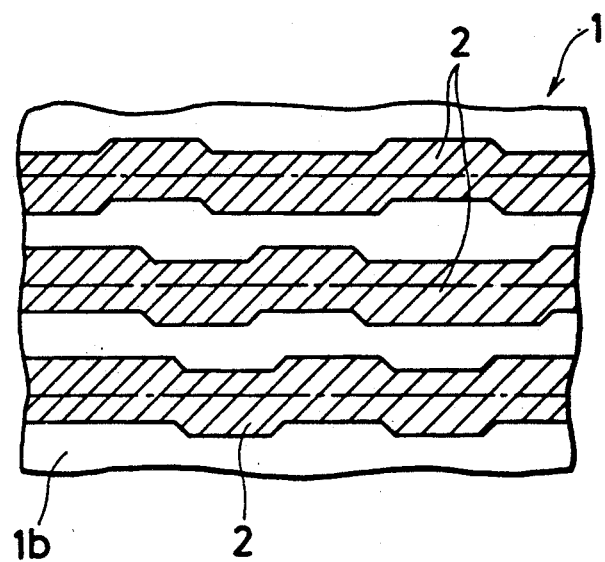
FIG. 2 is an enlarged partial view showing an information recording area in FIG. 1.

As shown in FIG. 2, in the TOC area 1a and the information recording area 1b on the magneto-optical disk 1, there are provided guiding grooves 2 (shown in hatching for convenience) formed in spiral shape or in concentric circle shape with predetermined intervals in a disk radius direction. Further, as shown in Japanese Patent Publication 39632/1989 (Tokukaisho 64-39632), absolute addresses are recorded on the magneto-optical disk 1 by giving transverse excursions inward and outward to each of the guiding grooves 2 on the magneto-optical disk 1 so as to show a modulated value of "1" or "0" after an application of bi-phase mark modulation to each of the absolute addresses.

The absolute addresses having been applied the bi-phase mark modulation thereto form pre-recorded information and are recorded with a substantially constant interval along the guiding grooves 2 forming tracks, on the assumption that rotation control is provided thereto in the CLV method. Accordingly, the frequency of recording for the pre-recorded information within a given angular range on the magneto-optical disk 1 becomes higher as the relevant position gets closer to the circumferential section of the disk 1.

The following description will discuss a case where an information recording operation is performed in MCAV method by using the above-mentioned magneto-optical disk 1.

Figure 4:
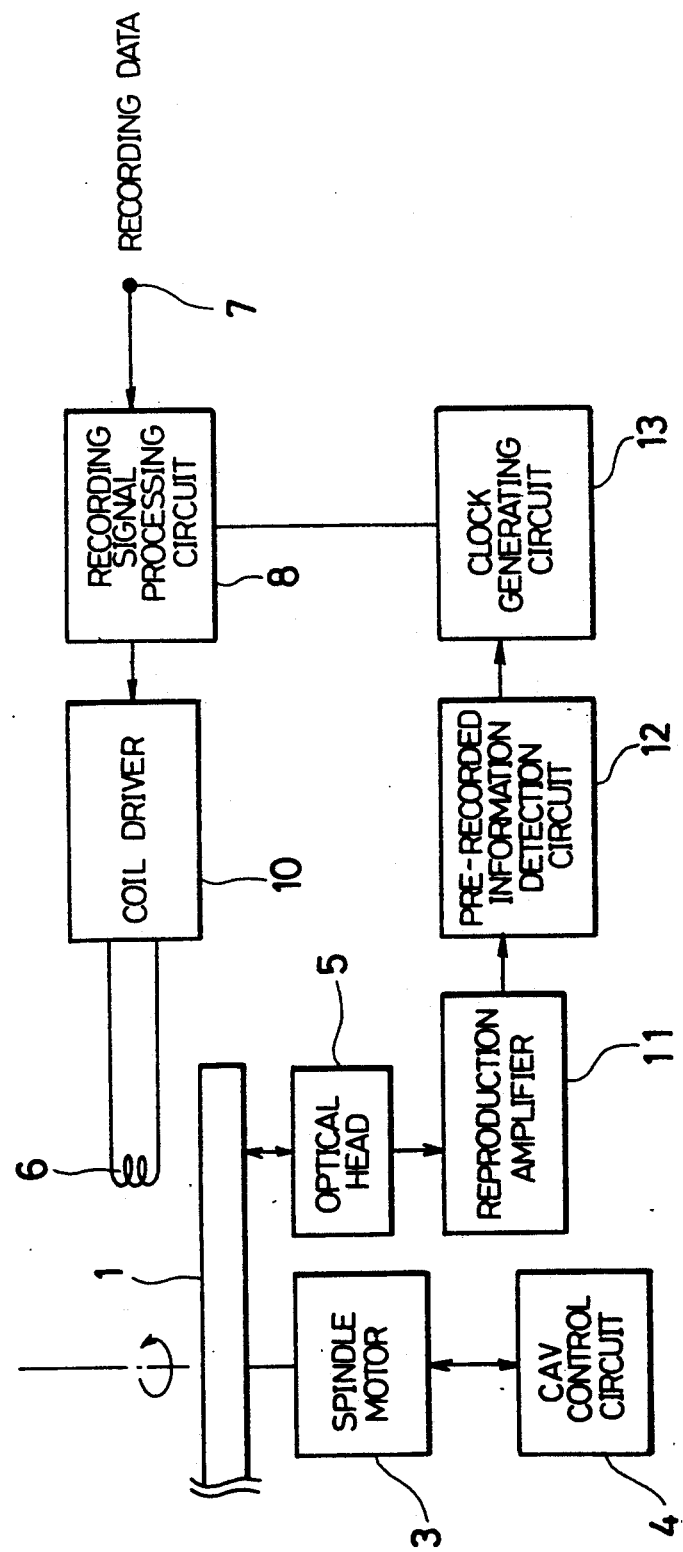

As shown in FIG. 4, an optical disk recording/reproducing device of the present invention comprises a spindle motor 3 functioning as driving means for supporting and rotatively driving the magneto-optical disk 1, a CAV control circuit 4 for controlling a rotation speed of the spindle motor 3 so as to rotate the magneto-optical disk 1 at a constant angular velocity (CAV), in other words, always at a constant rotation speed, an optical head 5 functioning on the one hand as recording means for applying an laser beam to the magneto-optical disk 1 during recording operations so as to bring a temperature rise at a predetermined position thereof and on the other hand as pre-recorded information reproducing means for reproducing pre-recorded information according to a beam reflected from the magneto-optical disk 1, and a coil (electro-magnet) 6 as recording means for applying a magnetic field to the magneto-optical disk 1 during recording operations.

The optical disk recording/reproducing device is designed to perform recording operations using a so-called magnetic field modulation method, and to be applicable over-writing operations thereto, wherein new information may be recorded on the recorded information by over-writing thereon. In addition, the recording operations may be performed using a so-called light modulation method instead of the magnetic field modulation method.

The optical disk recording/reproducing device is also provided therein with an input terminal 7 for entering information to be recorded. In a recording signal processing circuit 8, digital information entered through the input terminal 7 is synchronized to a clock from a clock generating circuit 13, which will be described later, and is applied other predetermined processing thereto, if necessary, and then is supplied to a coil driver 10. As will be described later, a frequency of the clock supplied from the clock generating circuit 13 becomes higher as the relevant position gets closer to the circumferential section of the magneto-optical disk 1, and therefore a frequency for recording becomes higher in a position closer to the circumferential section of the magneto-optical disk 1.

During recording operations, the coil driver 10 drives the coil 6 according to the signal supplied from the recording signal processing circuit 8, and at the same time a laser beam is applied to the magneto-optical disk 1 from the optical head 5, thereby permitting the signal to be recorded thereon.

Furthermore, the laser beam applied to the magneto-optical disk 1 from the optical head 5 during the recording operation, is reflected therefrom and enters the optical head 5 again, and according to the reflected beam, detection of the pre-recorded information is performed. More specifically, the beam reflected from the magneto-optical disk 1 is received by a photo detector included in the optical head 5 and is converted to an electric signal, and an output signal of the photo detector derived from the electric signal, after amplified in the reproduction amplifier 11, is sent to a pre-recorded information detection circuit 12 including, for example, a band-pass filter.

The pre-recorded information detection circuit 12 is arranged to extract only pre-recorded information indicated by the transverse excursion of the guiding grooves 2 from signals reproduced by the magneto-optical disk 1 during recording. In other words, by setting a frequency band of the pre-recorded information in a comparatively narrow range, and by making it different from a frequency band of the information formed of magneto-optical signals, only the pre-recorded information may be separated by the pre-recorded information detection circuit 12.

The pre-recorded information detected by the pre-recorded information detection circuit 12 is sent to a clock generating circuit 13 as first reference signal generating means, where a recording clock as a first reference signal is generated according to a frequency component of the pre-recorded information. When inputted to the clock generating circuit 13, absolute addresses forming the pre-recorded information have not been demodulated yet, and are in a condition of bi-phase-mark modulated waves. The frequency of the recording clock is formed so as to be directly proportional to a recording frequency of the bi-phase-mark modulated waves of the pre-recorded information. Since the rotation of the magneto-optical disk 1 is controlled by a CAV method, the detected frequency of the pre-recorded information becomes higher as the relevant position gets closer to the circumferential section on the magneto-optical disk 1. Accordingly, the frequency of the clock generated in the clock generating circuit 13 becomes higher as the relevant position gets closer to the circumferential section on the magneto-optical disk 1. For that reason, the recording frequency becomes higher in a position closer to the circumferential section on the magneto-optical disk 1, and consequently a recording density of information is kept constant regardless of positions on the disk 1.

Additionally, although not shown in the figures, the optical disk recording/reproducing device is provided with a pre-recorded information demodulation circuit for demodulating the bi-phase-mark modulated waves of the absolute addresses deteced by the pre-recorded information detection circuit 12 so as to read the absolute addresses, and thus designed to permit the values of the absolute addresses to be recognized by using the pre-recorded information demodulation circuit, as occasion demands in access operation or the like.

The following description will discuss an example of an arrangement of the clock generating circuit 13.

Figure 5:
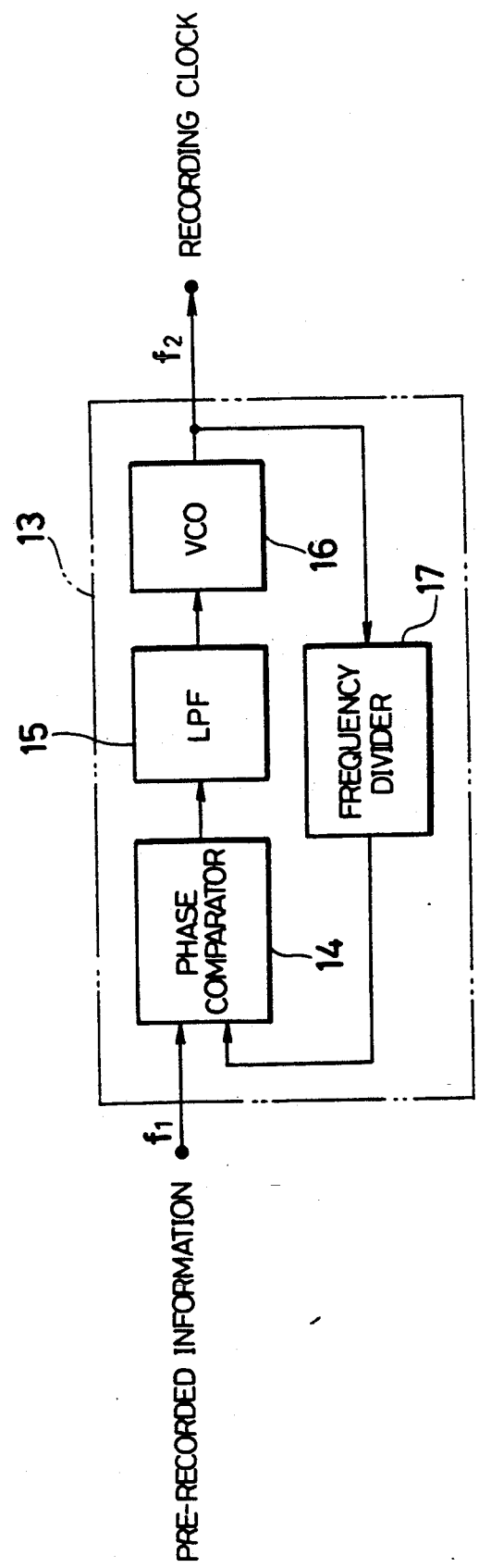

As shown in FIG. 5, the clock generating circuit 13 is designed as a so-called phase locked loop (PLL), and comprises a phase comparator 14, a low-pass filter (LPF) 15, a voltage control oscillator (VCO) 16 and a frequency divider 17.

More specifically, to one of the input terminals of the phase comparator 14, are entered bi-phase-mark modulated waves of the absolute addresses as the pre-recorded information from the pre-recorded information detection circuit 12. An output signal from the phase comparator 14 is sent to the voltage control oscillator 16 through the low-pass filter 15, and a recording clock as an output signal of the voltage control oscillator 16 is sent to the recording signal processing circuit 8. The recording clock is also sent to the frequency divider 17, and after having been divided down by a predetermined ratio by the frequency divider 17, is inputted to the other input terminals of the phase comparator 14.

Additionally, a recording frequency $f_1$ of the bi-phase-mark modulated waves of the absolute addresses, which is inputted to one of the input terminals of the phase comparator 14, varies depending on positions on the magneto-optical disk 1, and the variation is within the range of, for example, several kHz to several tens of kHz. Moreover, a frequency $f_2$ of the recording clock released from the voltage control oscillator 16, varies in proportion to the $f_1$, and the variation is within the range of, for example, several MHz.

Figure 6:
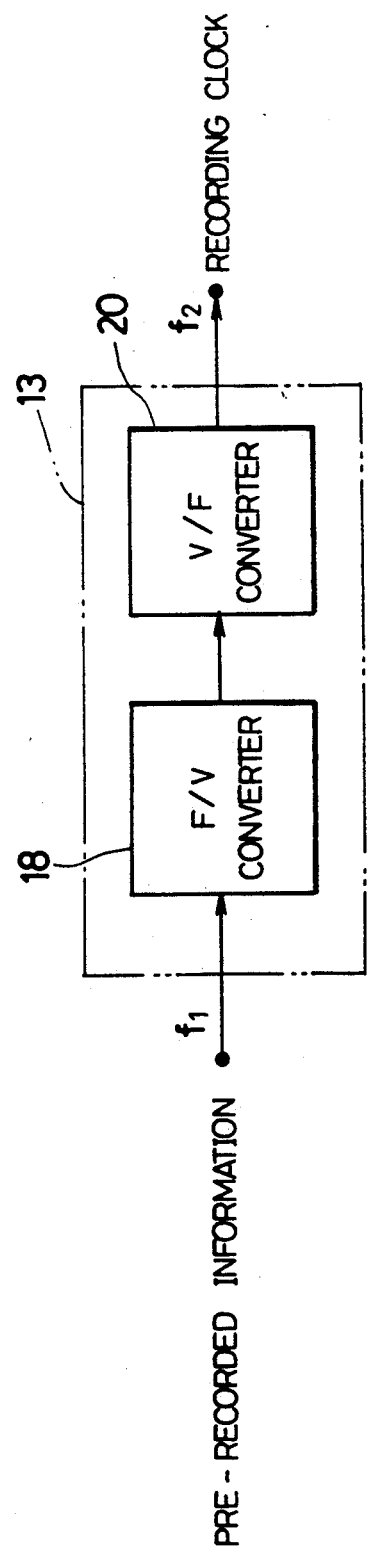

FIG. 6 shows another example of an arrangement of the clock generating circuit 13. In the arrangement, the clock generating circuit 13 comprises F/V (frequency/voltage) converter 18 and V/F (voltage/frequency) converter 20 located at the next stage thereof, and the bi-phase-mark modulated waves of the pre-recorded information are inputted to the F/V converter 18, thereby permitting an output of the V/F converter 20 to form a recording clock. In addition, converting rates of the respective F/V converter 18 and V/F converter 20 are predeterminately set so that the frequency $f_2$ of the recording clock may become substantially greater than the recording frequency $f_1$ of the bi-phase-mark modulated waves of the absolute addresses as the pre-recorded information.

Figure 7:
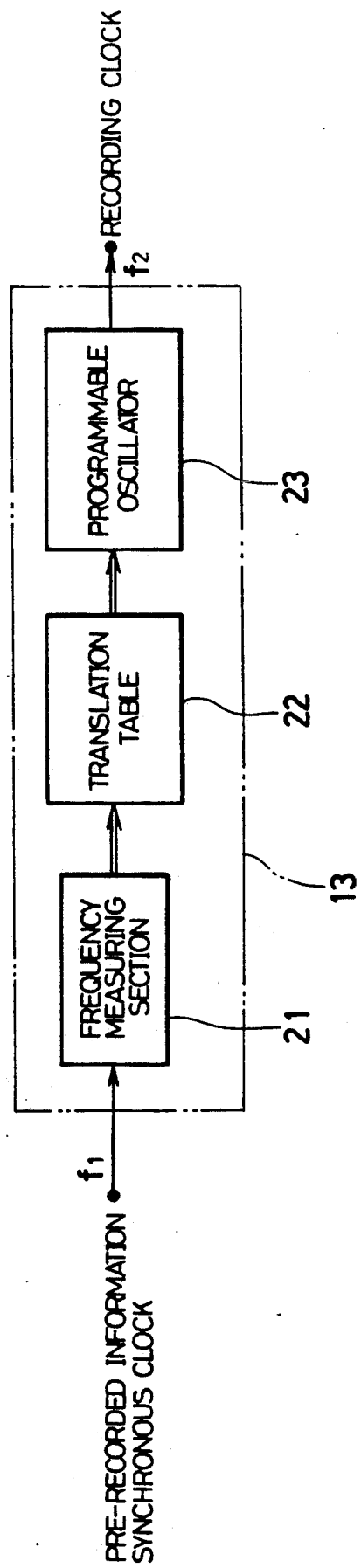

FIG. 7 shows still another example of an arrangement of the clock generating circuit 13. In the arrangement, the clock generating circuit 13 comprises a frequency measuring section 21 which counts changing points of a synchronous clock per predetermined unit of time, generated by a phase synchronous circuit (not shown) according to the bi-phase-mark modulated waves of the absolute addresses as the pre-recorded information, and also comprises a ROM and the like. The clock generating circuit 13 also includes a translation table 22 and a programmable oscillator 23, the former releases a value corresponding to a frequency measured in the frequency measuring section 21 to the latter, and the programmable oscillator 23 oscillates with a frequency $f_2$ according to the value from the translation table 22, thereby releasing a recording clock as an output signal thereof.

Figure 8:
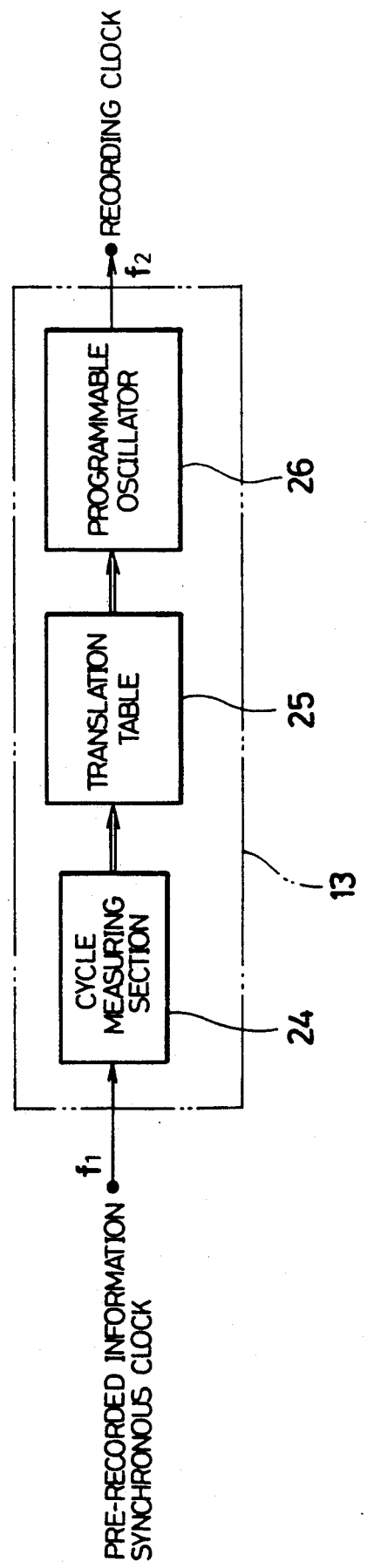

FIG. 8 shows a further example of an arrangement of the clock generating circuit 13. The clock generating circuit 13 comprises a cycle measuring section 24 which finds an average cycle based on a high-speed clock by counting intervals between changing points of a synchronous clock generated by a phase synchronous circuit (not shown) according to the bi-phase-mark modulated waves of the absolute addresses as the pre-recorded information, and also comprises a translation table 25 and a programmable oscillator 26, the former releases a value corresponding to a frequency measured in the cycle measuring section 24 to the latter, and the programmable oscillator 26 oscillates with a frequency $f_2$ according to the value from the translation table 25, thereby releasing a recording clock as an output signal thereof.

Figure 3:
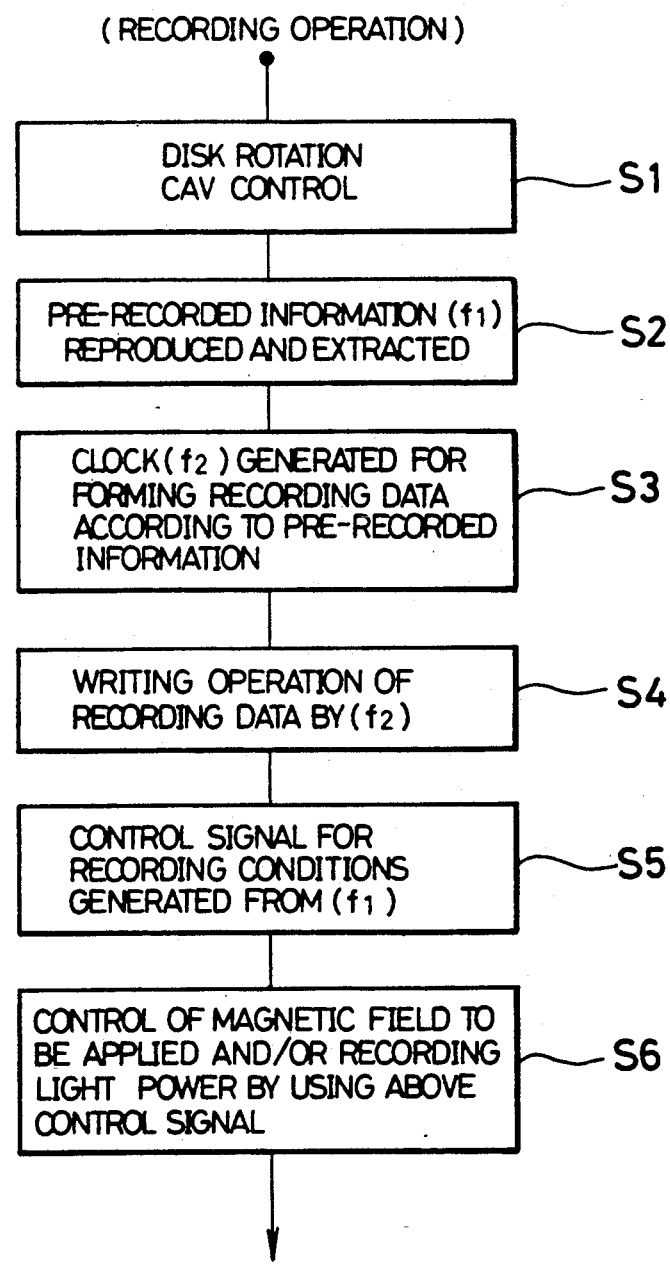
FIGS. 3 to 8 show one embodiment of the present invention.

As aforementioned, as shown in FIG. 3, in the present embodiment, the magneto-optical disk 1 is rotated by providing rotation control in a CAV method (S1); information recorded on the magneto-optical disk 1 is reproduced, and bi-phase-mark modulated waves of absolute addresses as pre-recorded information are extracted from the reproduced information, and then a recording frequency $f_1$ is detected from the bi-phase-mark modulated waves (S2); a clock (frequency $f_2$) for generating recording data is generated from the recording frequency $f_1$ (S3); and writing operation for recording data is performed by using the clock (S4). Additionally, FIG. 3 merely gives a general explanation on the contents of the present invention, and does not show detailed processing procedures thereof.

Figure 9:
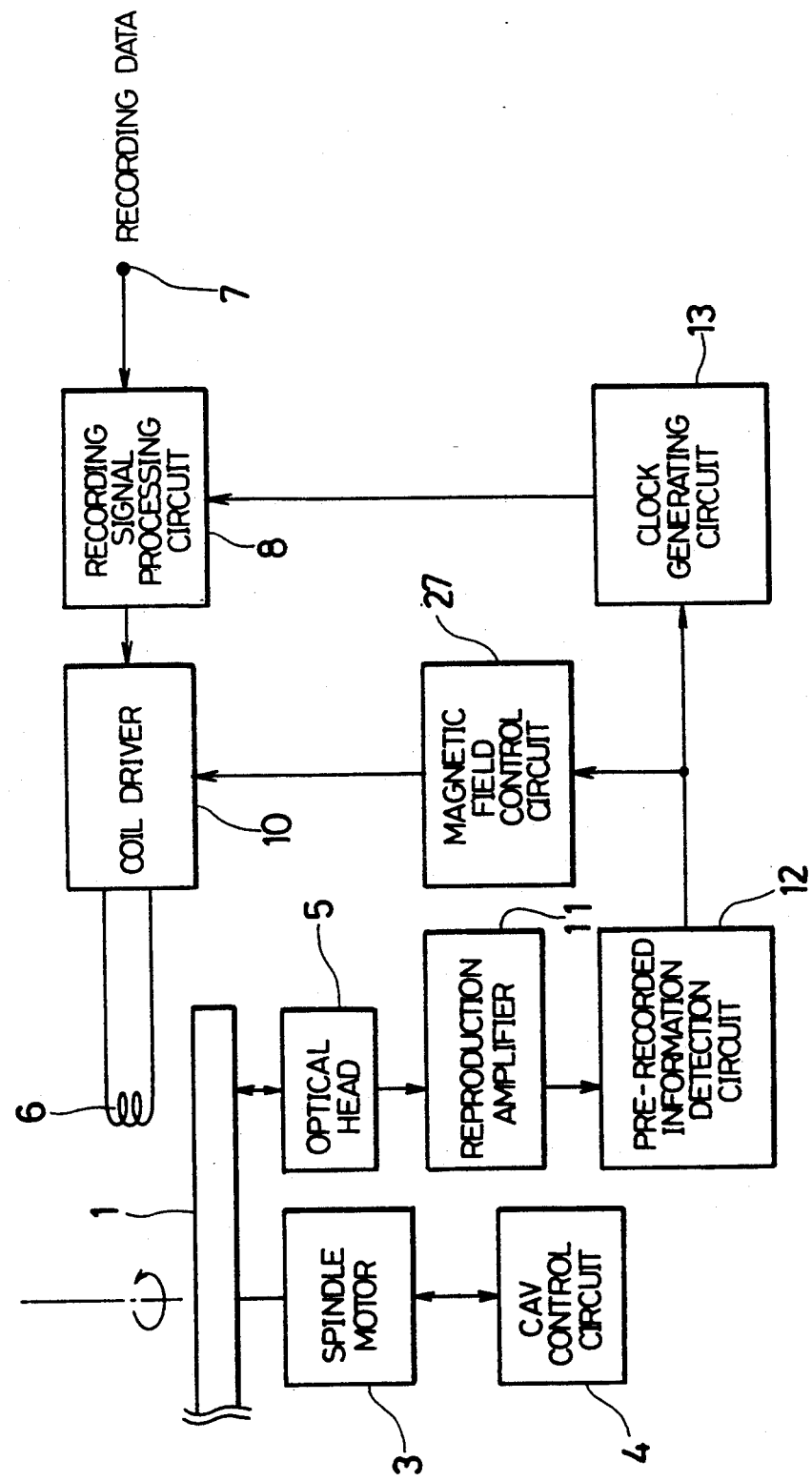

The following description will discuss another embodiment of the present invention referring to FIGS. 9 to 11. Those elements having the same functions and described in the aforementioned embodiment are indicated by the same reference numerals and the description thereof is omitted.

As shown in FIG. 9, an optical disk recording/reproducing device of the present embodiment has a substantially similar arrangement to that of the aforementioned. More specifically, a recording clock, which varies according to a relevant position in a radius direction on a magneto-optical disk 1, is generated by a clock generating circuit 13 according to pre-recorded information, and a frequency for recording corresponding to the relevant position on the magneto-optical disk 1 in a radius direction is used during recording operations. Further, in the present embodiment, there is installed a magnetic field control circuit 27 for changing intensity of a magnetic field applied by a coil 6, which forms one of recording conditions, according to the frequency for recording in recording operation.

The following description will discuss the magnetic field control circuit 27. The magnetic field control circuit 27, which functions as second reference signal generation means and as recording condition setting means, comprises, for example, an F/V converter 28 as shown in FIG. 10. To the F/V converter 28, bi-phase-mark modulated waves derived from absolute addresses as pre-recorded information from a pre-recorded information detection circuit 12 are sent, and a most suitable magnetic field is found with respect to a linear velocity of the disk 1 in accordance with a recording frequency of the bi-phase-mark modulated waves, (where the linear velocity is not constant since rotation control is provided in CAV method). Then, a magnetic field control signal formed by a voltage having a value corresponding to the most suitable magnetic field is released to a coil driver 10.

Thus, the arrangement permits the intensity of the magnetic field generated by the coil 6 to increase as the recording frequency of the bi-phase-mark modulated waves of the absolute addresses becomes greater, that is, as the linear velocity of the disk 1 becomes greater. As a result, such effects as improvement of S/N ratio in reproduction may be obtained.

FIG. 11 shows another example of an arrangement of the magnetic field control circuit 27. In the arrangement, the magnetic field control circuit 27 comprises an address decoder 30 for recognizing values of the absolute addresses by demodulating the pre-recorded information formed of the bi-phase-mark modulated waves of the absolute addresses, a translation table 31 for releasing a magnetic field control signal according to a value of each absolute address from the address decoder 30 and a D/A converter 32 for converting the magnetic field control signal released from the translation table 31 from a digital to an analog format so as to release it to the coil driver 10. Also in that case, the arrangement permits the intensity of the magnetic field applied by the coil 6 to increase as the recording frequency becomes greater, that is, as the linear velocity of the disk 1 becomes greater.

Figure 12:
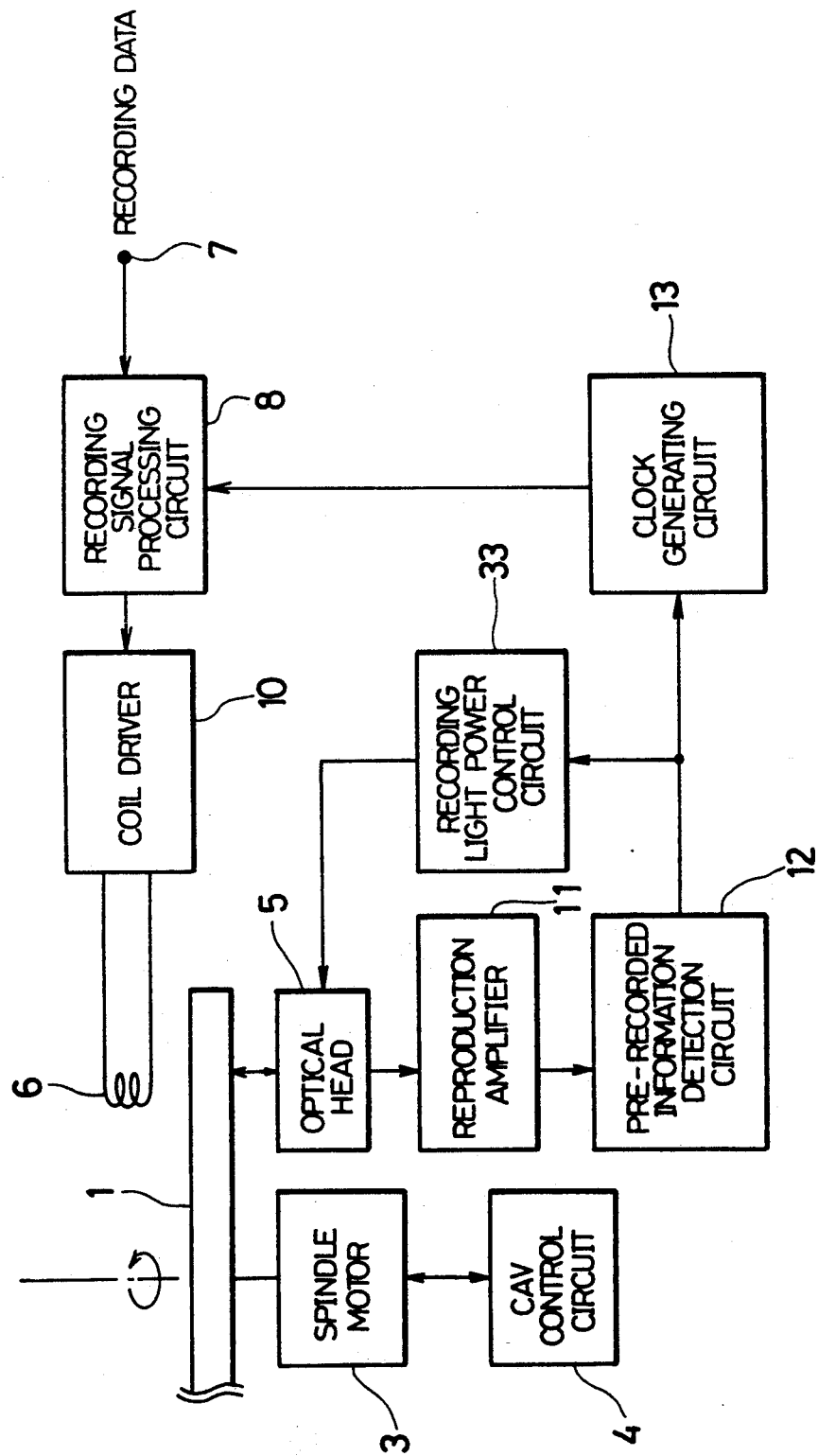
FIGS. 12 to 14 show still another embodiment of the present invention.
Figure 13:
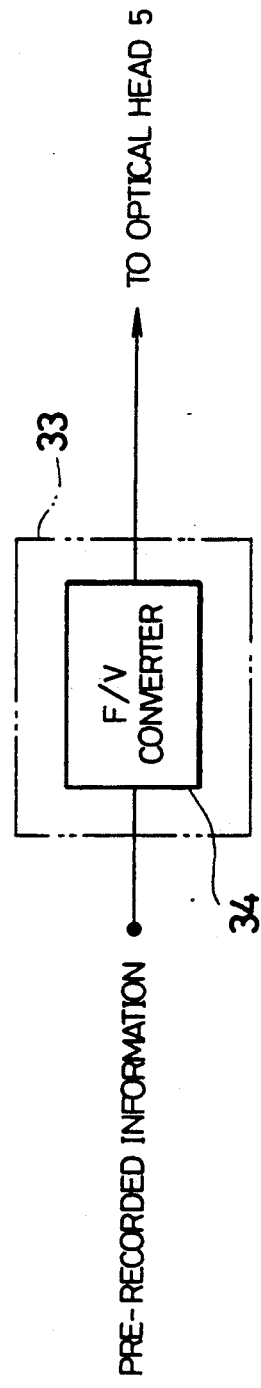
Figure 14:
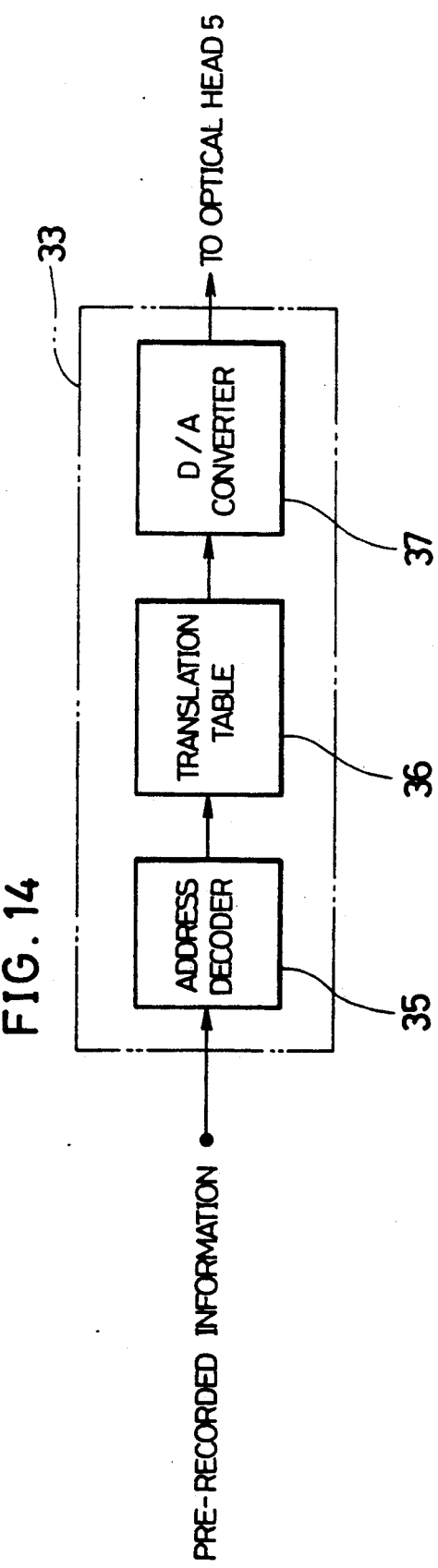

The following description will discuss still another embodiment of the present invention referring to FIGS. 12 to 14.

As shown in FIG. 12, an optical disk recording/reproducing device of the present embodiment also has basically the same arrangement as that of the aforementioned embodiment shown in FIG. 9. Accordingly, those of the members having the same functions and described in the first embodiment are indicated by the same reference numerals and the description thereof is omitted. The device of the present embodiment comprises a recording light power control circuit 33 for changing recording light power as one of recording conditions, that is, for changing light power of a laser beam applied from the optical head 5 onto a magneto-optical disk 1, according to variation of a frequency for recording.

As shown in FIG. 13, the recording light power control circuit 33, which functions as second reference signal generation means and as recording condition setting means, comprises, for example, an F/V converter 34. In the arrangement, to an optical head 5, is inputted a voltage in accordance with a recording frequency of bi-phase-mark modulated waves derived from absolute addresses as pre-recorded information sent from a pre-recorded information detection circuit 12. Thus, the arrangement permits the power of the laser beam applied by the optical head 5 to increase, as the frequency for recording becomes higher, that is, as the linear velocity of the disk 1 becomes greater. As a result, such effects as improvement of S/N ratio in reproduction may be obtained.

FIG. 14 shows another example of an arrangement of the recording light power control circuit 33. The recording light power control circuit 33 comprises an address decoder 35 for recognizing values of the absolute addresses by demodulating the bi-phase-mark modulated waves of the absolute addresses as the pre-recorded information, a translation table 36 for releasing a light power control signal as a second reference signal in accordance with a value of each absolute address from the address decoder 35, and a D/A converter 37 for converting the light power control signal from the translation table 36 from a digital to an analog format so as to release it to an optical head 5. Also in that case, the arrangement permits the power of the laser beam applied by the optical head 5 to increase, as the frequency for recording becomes higher, that is, as the linear velocity of the disk 1 becomes greater.

Additionally, in the devices as examples shown in FIG. 9 and FIG. 12, it is designed that either the intensity of the magnetic field or the recording light power is independently changed according to the variation of the frequency for recording; however, instead of the arrangement, both the intensity of the magnetic field and the recording light power may be changed. Further, pulse width of the recording information is taken as another recording condition, which may be changed according to the variation of the frequency for recording.

Also in the embodiments shown in FIG. 9 and FIG. 12, as with the embodiment shown in FIG. 4, as shown in FIG. 3, by utilizing the fact that the recording frequency $f_1$ of the bi-phase-mark modulated waves of the absolute addresses as the pre-recorded information varies depending on positions on the magneto-optical disk 1 in a radius direction, the recording clock $f_2$ is generated according to the recording frequency $f_1$ (S1 to S4). Then, the control signal indicating recording conditions is generated according to the pre-recorded information (S5), and by using the control signal, the intensity of the magnetic field to be applied and/or the light power for recording are/is controlled (S6), thereby improving the S/N ratio in reproduction.

Moreover, in the aforementioned embodiments, the descriptions are given with respect to the magneto-optical disk 1 as an optical disk; however, besides such application, the present invention is applicable to optical disks of re-writable type such as those of so-called phase-change type or to those of DRAW type capable of recording only once.

As aforementioned, an optical disk recording/reproducing device of the present invention, which records and/or reproduces information on and/or from an optical disk wherein pre-recorded information is cyclically provided along a track so as to permit rotation control by a constant linear velocity for the entire region thereof, comprises: driving means for rotatively driving the optical disk at a constant angular velocity; pre-recorded information reproducing means for reproducing the pre-recorded information in a recording operation; first reference signal generation means for generating a first reference signal according to a recording frequency of the pre-recorded information reproduced by the pre-recorded information reproducing means; and recording means for performing a recording operation by using a frequency for recording in accordance with the first reference signal.

With the above arrangement, since the optical disk, which has pre-recorded information such as absolute addresses provided thereon so as to permit rotation control by a constant linear velocity (CLV), is rotated at a constant angular velocity (CAV), the recording frequency of the pre-recorded information varies depending on positions on the optical disk in a radius direction. More specifically, since the pre-recorded information is given so as to provide rotation control by CLV, when the optical disk is rotated normally in CLV, the recording frequency of the pre-recorded information is kept substantially constant regardless of positions on the optical disk. However, since the density (frequency of recording) of the pre-recorded information within a given angular range becomes higher as the relevant position gets closer to the circumferential section of the optical disk, when the optical disk is rotated at a CAV, the recording frequency of the pre-recorded information becomes higher as the relevant position gets closer to the circumferential section of the optical disk.

On the other hand, in the MCAV method, since a frequency for recording becomes higher as the relevant position gets closer to the circumferential section of the optical disk, it is arranged to generate a first reference signal such as a recording clock according to a recording frequency of the pre-recorded information, and to perform recording operation using the frequency for recording in response to the first reference signal. Thus, by making the recording density on the optical disk constant regardless of inner or outer sections on the optical disk, the recording operation by MCAV method is performed. In that case, since the frequency for recording is determined according to the pre-recorded information predeterminately recorded on the optical disk, it may be set accurately, and the recording density is kept constant regardless of positions on the optical disk.

Further, since the optical disk has pre-recorded information provided thereon for a CLV method so as to permit rotation control originally by CLV method, the optical disk may be used both in CLV method as well as in MCAV method, and thus utility value of the optical disk is heightened.

However, in the case of recording information while changing a frequency for recording in MCAV method, it is difficult to obtain even quality of reproduced signals when the recording operation is performed under constant recording conditions, since the linear velocity is different depending on positions on the disk in a radius direction.

Therefore, by providing second reference signal generation means for generating a second reference signal to determine recording conditions including at least either light power for recording or intensity of magnetic field for recording, according to the pre-recorded information reproduced by the reproducing means, and recording condition setting means for determining recording conditions according to the second reference signal from the second reference signal generation means and for releasing them to the recording means, the recording conditions may be changed according to the recording frequency of the pre-recorded information, in other words, depending on positions on the optical disk (for example, the light power and/or intensity of magnetic field are/is increased as the frequency for recording becomes higher.) Thus, the S/N ratio in reproduction may be improved, and consequently quality of the reproduced signals is enhanced.

The following description will discuss still another embodiment of the present invention referring to FIG. 1 and FIG. 2 as well as FIGS. 15 to 18.

In the present embodiment, reproducing operation of an optical disk recording/reproducing device will be described. Accordingly, those members having the same functions and described in the aforementioned embodiment shown in FIG. 1 are indicated by the same reference numerals. Further, as an optical disk, the same magneto-optical disk 1 (see FIGS. 1 and 2) used in the aforementioned embodiments is employed. Additionally, hereinafter, the description is given on the case wherein the magneto-optical disk 1 having various data and the like recorded thereon is reproduced by MCAV method.

Figure 16:
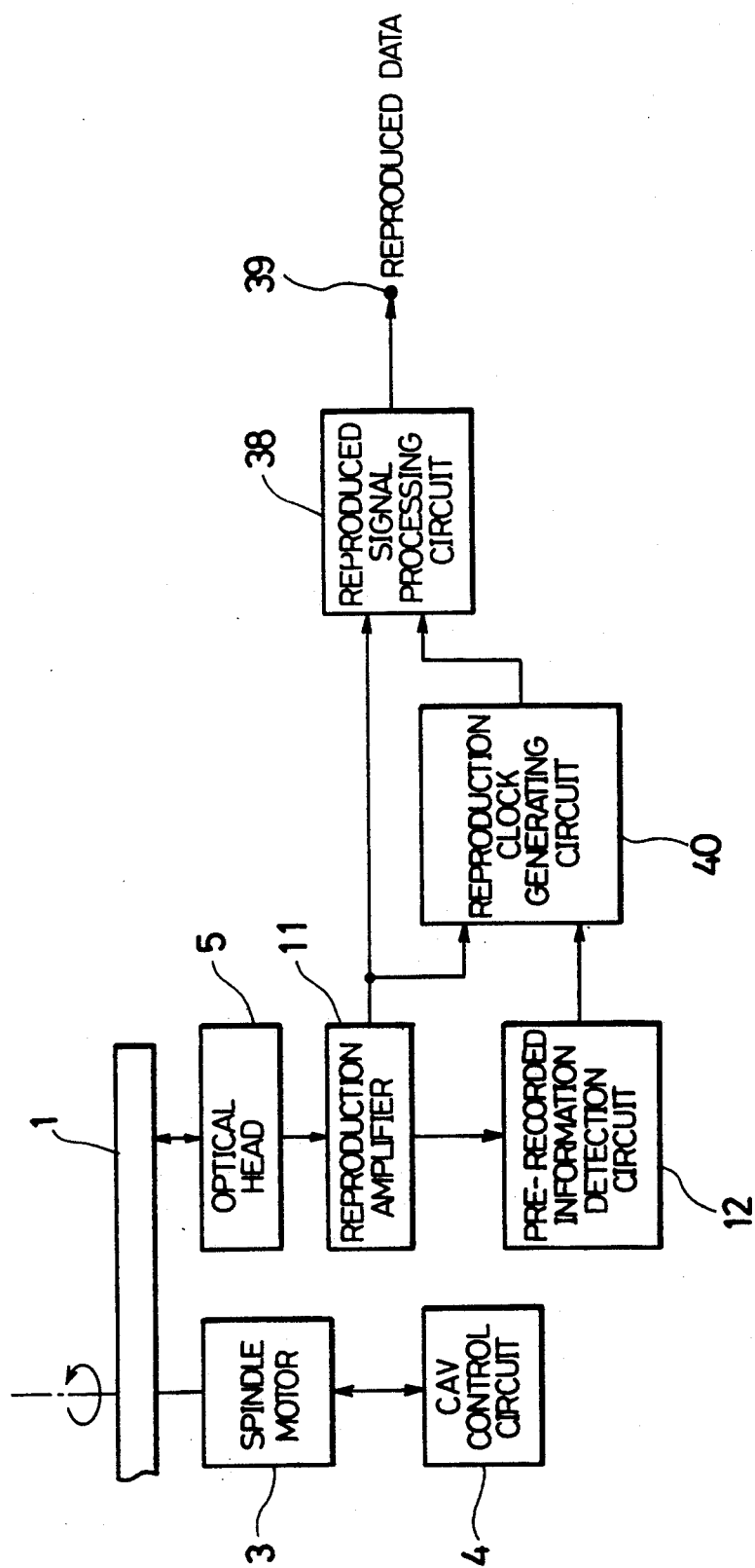

As shown in FIG. 16, an optical disk recording/reproducing device of the present embodiment comprises a spindle motor 3 for supporting and rotatively driving the magneto-optical disk 1, a CAV control circuit 4 for controlling rotation speed of the spindle motor 3 at a constant angular velocity (CAV) and an optical head 5. The optical head 5 functions as reproducing means, wherein a laser beam is applied onto the magneto-optical disk 1, and according to a reflected beam therefrom, the reproducing operation is executed for recorded information such as various data recorded in pits or in magneto-optical signals, and for pre-recorded information formed of bi-phase-mark modulated waves of absolute addresses recorded by the transverse excursion of guiding grooves 2. In those information signals reproduced from the magneto-optical disk 1, one of the signals derived from the reproduction of the recorded information is, hereinafter, called reproduced signal, and the other derived from the reproduction of the pre-recorded information is called pre-recorded information, as it is.

The optical disk recording/reproducing device is provided therein with a reproduction amplifier 11 for amplifying the reproduced signal as well as the pre-recorded information, sent from the optical head 5. The reproduced signal amplified by the reproduction amplifier 11 is sent to a reproduced signal processing circuit 38, where after being applied predetermined processing thereto according to a reproduction clock supplied from a reproduction clock generating circuit 40 which will be described later, the reproduced signal is released through an output terminal 39 as reproduced data.

The reproduced signal and the pre-recorded information amplified by the reproduction amplifier 11 are also sent to a pre-recorded information detection circuit 12, where, as aforementioned in the foregoing embodiments, only the pre-recorded information formed of bi-phase-mark modulated waves of absolute addresses is extracted.

The pre-recorded information extracted by the pre-recorded information detection circuit 12 is sent to the reproduction clock generating circuit 40 as reference signal generating means. On the other hand, the reproduced signal from the reproduction amplifier 11 is also sent to the reproduction clock generating circuit 40, Then, in the reproduction clock generating circuit 40, a reproduction clock is generated as a reference signal which is directly proportional to a recording frequency $f_5$ derived from bi-phase-mark modulated waves of the absolute addresses as the pre-recorded information, and is sent to the reproduced signal processing circuit 38. Additionally, since the rotation of the magneto-optical disk 1 is controlled by CAV method, the recording frequency $f_5$ of the bi-phase-mark modulated waves of the absolute addresses becomes higher as the relevant position gets closer to the circumferential section on the magneto-optical disk 1, as aforementioned, and accordingly, a frequency $f_4$ of the reproduction clock also becomes higher as the relevant position gets closer to the circumferntial section on the magneto-optical disk 1. With the arrangement, the reproduced data are extracted in cycles according to the relevant positions on the magneto-optical disk 1 in a radius direction, in the reproduced signal processing circuit 38.

Figure 15:
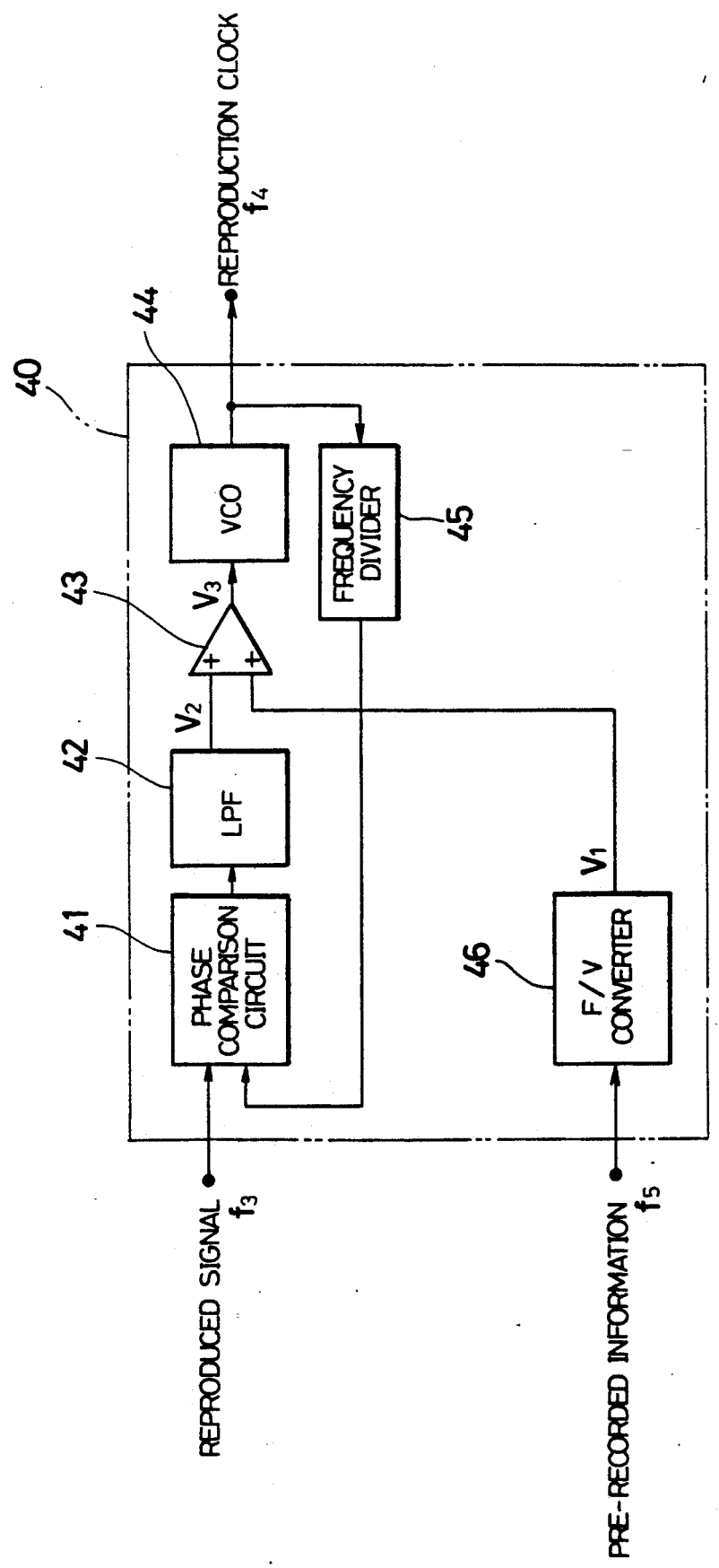

The following description will discuss a detailed arrangement of the reproduction clock generating circuit 40 referring to FIG. 15.

The reproduction clock generating circuit 40 comprises a phase comparison circuit 41, a low-pass filter (LPF) 42, an adder 43, a voltage control oscillator (VCO) 44, a frequency divider 45 and an F/V (frequency/voltage) converter 46, and functions as a kind of phase locked loop (PLL).

To one of the input terminals of the phase comparison circuit 41, is inputted the reproduced signal from a reproduction amplifier 11. An output signal of the phase comparison circuit 41 is inputted to the low-pass filter 42, and an output voltage $V_2$ of the low-pass filter 42 is inputted to one of the input terminals of the adder 43. Further, to the input terminal of the F/V converter 46, are inputted the bi-phase-mark modulated waves of the absolute addresses as the pre-recorded information from a pre-recorded information detection circuit 12, and a recording frequency $f_5$ of the bi-phase-mark modulated waves is converted into a corresponding voltage $V_1$, which is inputted to the other input terminals of the adder 43.

An output voltage $V_3$ of the adder 43 is entered to the voltage control oscillator 44, where oscillation with the frequency $f_4$ according to the output voltage $V_3$ is performed. Thus, an output signal of the voltage control oscillator 44 forms a reproduction clock. The reproduction clock is not only sent to the reproduced signal processing circuit 38, but also sent to the other input terminals of the phase comparison circuit 41 through the frequency divider 45.

Figure 17:
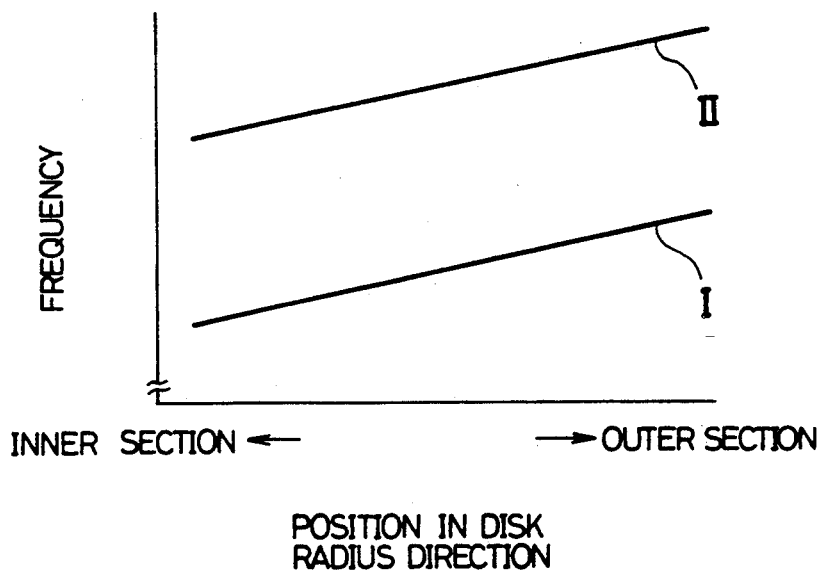

As shown by I in FIG. 17, the frequency $f_5$ of the pre-recorded information becomes higher as the relevant position gets closer to the circumferential section on the magneto-optical disk 1, as aforementioned. Further, as shown by II in the same figure, the frequency $f_3$ of the reproduced signal, which is higher than the frequency $f_5$ of the pre-recorded information, also becomes higher as the relevant position gets closer to the circumferential section on the optical disk 1.

Figure 18:
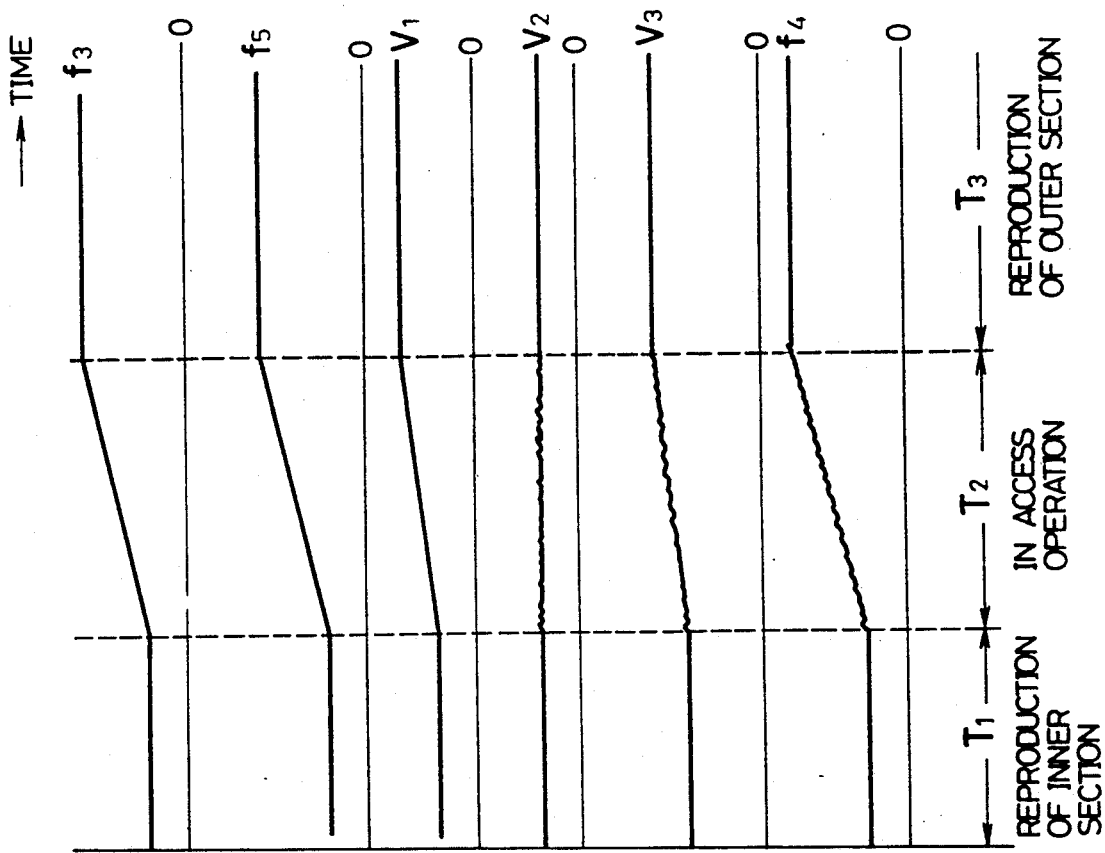

FIG. 18 shows a transition of each of the output signals in the reproduction clock generating circuit 40 when an access operation is performed from an inner section to an outer section on the magneto-optical disk 1. As shown by (a) in FIG. 18, during reproducing time $T_1$ of the inner section, the frequency $f_3$ of the reproduced signal inputted to one of the input terminals of the phase comparison circuit 41 is kept substantially constant as long as the same track or a group of tracks positioned close to one another is reproduced. During time $T_2$ in the access operation, the frequency $f_3$ of the reproduced signal gradually increases, and during reproducing time $T_3$ of the outer section after the completion of the access operation, the frequency $f_3$ of the reproduced signal becomes substantially constant keeping a higher value than that during the reproducing time $T_1$ of the inner section.

Moreover, as shown by (b) and (c) in FIG. 18, the frequency $f_5$ of the pre-recorded information and the output voltage $V_1$ of the F/V converter 46 also show a similar tendency to the frequency $f_3$ of the reproduced signal, and therefore are kept substantially constant during the reproducing time $T_1$ of the inner section; gradually increases during time $T_2$ in the access operation; and becomes substantially constant during the reproducing time $T_3$ of the outer section.

Furthermore, as shown by (d) in FIG. 18, the output voltage $V_2$ of the low-pass filter 42 has minor variations in itself during the time $T_2$ in the access operation; however, is considered substantially constant regardless of positions on the magneto-optical disk 1.

As shown by (e) and (f) in FIG. 18, the output voltage $V_3$ of the adder 43 and the frequency $f_4$ of the reproduction clock are kept constant during the reproducing time $T_1$ of the inner section, and gradually increase during the time $T_2$ in the access operation although they have minor variations in themselves during it, and then becomes substantially constant during the reproducing time $T_3$ of the outer section. As shown by (e) in FIG. 18, the output voltage $V_3$ of the adder 43 varies mainly in response to the output voltage $V_1$ of the F/V converter 46, that is, varies in response to the frequency $f_5$ of the pre-recorded information, and since the output voltage $V_3$ of the adder 43 becomes greater as the relevant position gets closer to the circumferential section on the magneto-optical disk 1, the frequency $f_4$ of the reproduction clock becomes higher as the relevant position gets closer to the circumferential section on the magneto-optical disk 1, as shown by (f) in FIG. 18 figure.

As aforementioned, the frequency $f_4$ of the reproduction clock varies mainly in response to the frequency $f_5$ of the pre-recorded information. Therefore, even when the detection of the reproduced signal is impossible due to the existence of unrecorded area of information, during the access operation, since the detection of the pre-recorded information is possible, the reproduction clock may be generated according to the pre-recorded information during the access operation. As a result, after the completion of the access operation, the PLL in the reproduction clock generating circuit 40 is locked, thereby permitting a smooth start of a reproducing operation after the access operation.

Additionally, when the access operation is divided into two processes, that is, a rough access for shifting the optical head 5 to a vicinity of a target track at high speed and a minute access for shifting the optical head 5 to the target track after the rough access while reading the absolute addresses included in the pre-recorded information, since a complete reproduction of the pre-recorded information is available at least in the minute access, a synchronization of the reproduction clock may be obtained at least upon the minute access.

The following description will discuss another example of an arrangement of the reproduction clock generating circuit 40 referring to FIGS. 19 to 22.

Figure 19:
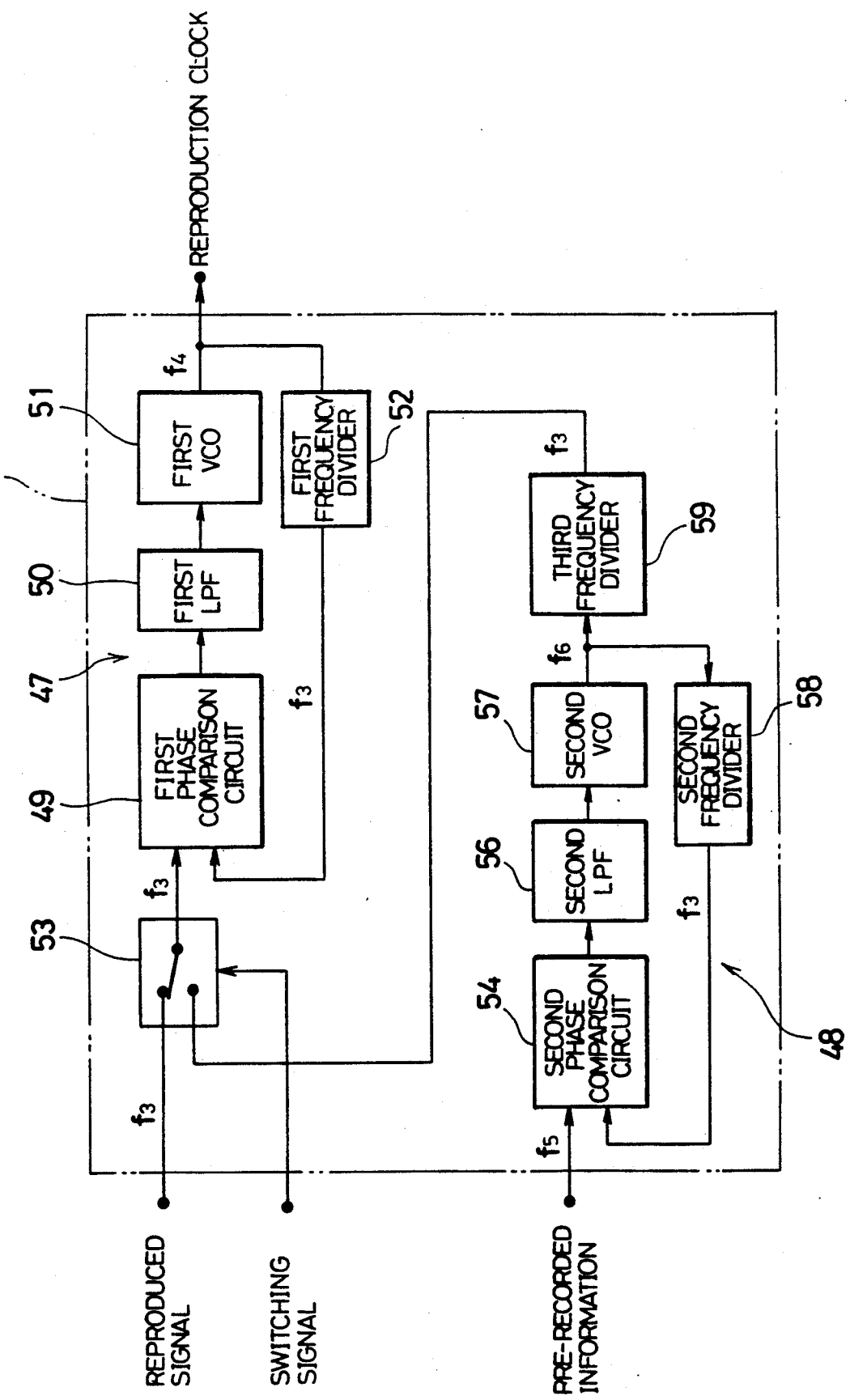

As shown in FIG. 19, the reproduction clock generating circuit 40 comprises a first phase locked loop (first PLL) 47 and a second phase locked loop (second PLL) 48. With the arrangement, the reproduction clock generating circuit 40 generates a reproduction clock according to a reproduced signal (binary signal) from a reproduction amplifier 11 in a normal reproduction, and on the other hand, generates the reproduction clock according to pre-recorded information from a pre-recorded information detection circuit 12 in an access operation.

More specifically, the first PLL 47 comprises a first phase comparison circuit 49, a first low-pass filter (first LPF) 50 disposed at the next stage thereof, a first voltage control oscillator (first VCO) 51 disposed at the next stage of the first LPF 50 and a first frequency divider 52 for dividing down a reproduced clock at a predetermined dividing ratio, which is an output signal of the first voltage control oscillator 51, and for releasing the reproduced clock after the processing to the first phase comparison circuit 49.

At a stage before the first PLL 47, a switching device 53 is disposed, and either the reproduced signal from the reproduction amplifier 11 or a signal from a third frequency divider 59, which will be described later, generated according to the pre-recorded information is inputted to the first phase comparison circuit 49 through the switching device 53. Additionally, in a normal reproduction, according to a switching signal inputted thereto from an external circuit outside of the reproduction clock generating circuit 40, the reproduced signal having a recording frequency $f_3$ is inputted to the first phase comparison circuit 49, and according to the reproduced signal, a reproduction clock having a frequency $f_4$ is generated in the first PLL 47.

The second PLL 48 comprises a second phase comparison circuit 54 to which bi-phase-mark modulated waves having a recording frequency $f_5$ of absolute addresses as pre-recorded information are inputted, a second low-pass filter (second LPF) 56 disposed in a stage thereafter, a second voltage control oscillator (second VCO) 57 disposed in a stage after the second LPF 56 and a second frequency divider 58 for dividing down a signal having a frequency $f_6$ which is an output signal of the second voltage control oscillator 57 at a predetermined dividing ratio so as to feedback it to the phase comparison circuit 54.

The signal having the frequency $f_6$ from the second VCO 57 is divided down at a predetermined dividing ratio in the third frequency divider 59, and sent to the switching device 53. The dividing ratio of the third frequency divider 59 is set so that the frequency of the output signal of the third frequency divider 59 may become substantially equal to the recording frequency $f_3$ of the reproduced signal.

In the switching device 53, the signal from the third frequency divider 59 is selected in access operation, and the reproduction clock is generated in the first PLL 47 according to the pre-recorded information. Additionally, since the frequency of the signal from the third frequency divider 59 is substantially equal to the recording frequency $f_3$ of the reproduced signal, the frequency of the reproduction clock becomes substantially equal whether it is generated according to the reproduced signal or to the pre-recorded information.

Also in the present embodiment, since it is arranged to generate the reproduction clock according to the pre-recorded information during access operation, the generation of the reproduction clock is performed smoothly, even if the detection of the reproduced signal is impossible during the access operation. Furthermore, since the synchronization of the reproduction clock is maintained during the access operation, even after the input to the first phase comparison circuit 49 is switched to the reproduced signal after the completion of the access, the synchronization of the reproduction clock with the reproduction signal is readily achieved, and thus a reproducing operation may be started in a short time after the completion of the access.

Figure 20:
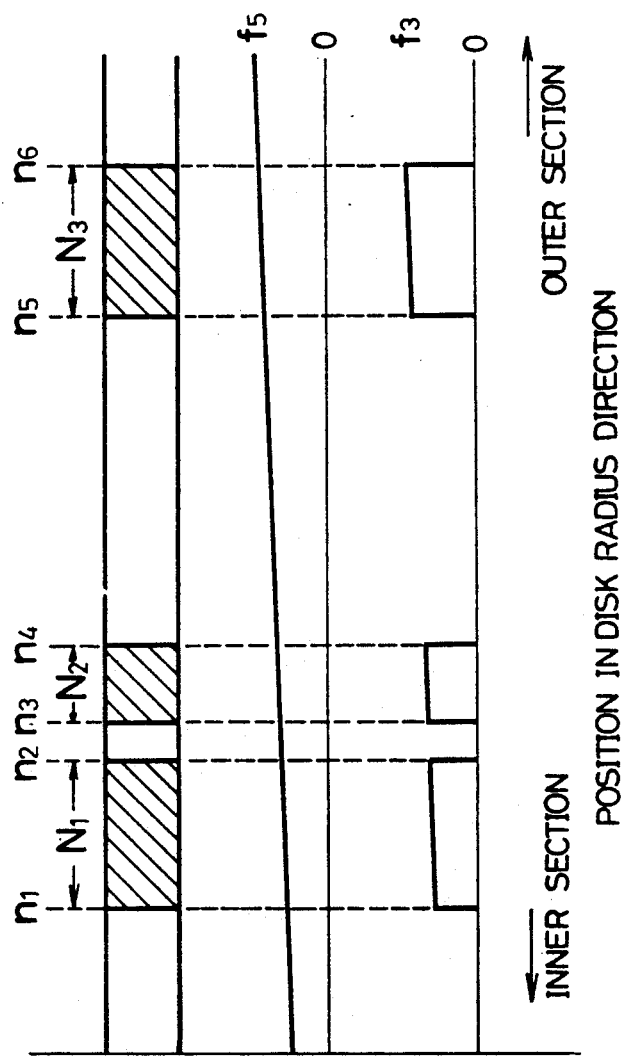

As shown by (a) in FIG. 20, now it is assumed that there are an area $N_1$ (a range of absolute address $n_1$ to $n_2$), an area $N_2$ (a range of absolute address $n_3$ to $n_4$) and an area $N_3$ (a range of absolute address $n_5$ to $n_6$), each having recorded information such as various data in an information recording area $1b$ on the magneto-optical disk 1. In that case, since the magneto-optical disk 1, which is provided with pre-recorded information on the entire region thereof for use by CLV method, is rotated by CAV rotation control method, the frequency $f_5$ of the pre-recorded information gradually increases as the relevant position proceeds from the inner section to the outer section on the magneto-optical disk 1 as shown by (b) FIG. 20, while the frequency $f_3$ of the reproduced signal gradually increases in each of areas $N_1$ to $N_3$ as the relevant position gets closer to the circumferential section on the optical disk 1 as shown by (c) in FIG. 20.

Here, the following description will discuss a case wherein an access operation by the optical head 5 is shifted from the area $N_1$ of the inner section to the area $N_3$ of the outer section while a reproducing operation is performed in the area $N_1$. In that case, as shown by (a) in FIG. 21, during the reproducing time $T_1$ of the inner section $N_1$, the frequency $f_3$ of the reproduced signal in reproducing one track or a group of tracks located close together is substantially constant. When the access operation is started, the frequency $f_3$ of the reproduced signal gradually increases while passing through the area $N_2$ during the access period $T_2$, and then during a period $T_3$ when a reproducing operation of the area $N_3$ is started after the completion of the access operation, the frequency $f_3$ of the reproduced signal becomes substantially constant in reproducing one track or a group of tracks located close together.

Moreover, in accessing from the area $N_1$ to the area $N_3$, the frequency $f_5$ of the pre-recorded information and the frequency $f_4$ of the reproduction clock vary as shown by (b) and (d) in FIG. 21 in their respective periods, before the access (period $T_1$), during the access (period $T_2$) and after the access (period $T_3$). Further, a switching signal to be supplied to the switching device 53 varies as shown by (c) in FIG. 21. In that case, when the switching signal is in "High" level, a signal from the third frequency divider 59 according to the pre-recorded information is inputted to the first phase comparison circuit 49, and on the other hand, when the switching signal is "Low" level, the reproduced signal is inputted to the first phase comparison circuit 49.

As aforementioned, in the present embodiment, as shown in FIG. 22, the reproduction of the signal is performed while rotating the magneto-optical disk 1 in CAV control method (S1); the access operation is started when an instruction is given for the access to a desired absolute address (S2); and immediately, the switching device 53 is switched so as to input the signal from the third frequency divider 59 to the first phase comparison circuit 49 (S3).

Then, it is judged whether the access has been completed or not (S4), and the same judging operation is repeated if the access has not been completed. If the access has been completed, the switching device 53 is switched so as to input the reproduced signal from the reproduction amplifier 11 to the first phase comparison circuit 49 (S5); and a normal reproducing operation is executed (S6).

Additionally, in the above embodiment, the switching operation of the switching device 53 is performed depending on whether the access is in operation or not; however, the switching operation may be performed by judging reproduced signal conditions such as detection of amplitude or errors of the reproduced signal.

Moreover, in the above embodiments, the description is given with respect to the magneto-optical disk 1 as an optical disk; however, besides such optical disks of re-writable type, the present invention is applicable to optical disks of read only type or to those of DRAW type capable of recording only once. In either case, the reproduction system may be arranged in a similar way to that of the above embodiments.

Further, the above optical disk recording/reproducing device may also provide a reproducing operation for CD-ROM's as optical disks used only for reproduction and having various information recorded thereon so as to be reproduced in CLV method. In that case, any CD-ROM disk is available as long as it has information pit rows as absolute addresses of pre-recorded information which are formed thereon by transverse excursion as shown in the above embodiments, and in accordance with the MCAV method of the present embodiment, since required reproducing time per one rotation of the disk is kept constant regardless of positions on the optical disk in a radius direction, required reproducing time for the entire region of the disk may be shortened.

As aforementioned, the optical disk recording/reproducing device of the present invention, which reproduces information from an optical disk wherein pre-recorded information is cyclically provided along tracks so as to permit rotation control at a constant linear velocity for the entire region thereof, comprises: driving means for rotatively driving the optical disk at a constant angular velocity; reproducing means for reproducing signals provided on the optical disk; reference signal generation means for generating a reference signal according to a recording frequency of the pre-recorded information in the signals reproduced by the reproducing means.

With the above arrangement, when an optical disk, which has pre-recorded information given thereto so as to provide rotation control at a CLV, is rotated in CLV method, a recording frequency of the pre-recorded information is kept substantially constant regardless of positions on the optical disk, and on the other hand, when the optical disk is rotated in CAV method, as shown in the above embodiment, a recording frequency of the pre-recorded information gradually becomes higher as the relevant position gets closer to the circumferential section on the optical disk. Accordingly, as aforementioned, by generating the reference signal such as the reproducing clock according to the recording frequency of the pre-recorded information, the arrangement makes it possible to generate an accurate reference signal whose frequency becomes higher as the relevant position gets closer to the circumferential section on the disk. Thus, a high speed access may be achieved without the need for changing the rotation number of the disk, and a reproducing operation of the information may be executed immediately after the access according to the reference signal.

Moreover, since the reproducing operation is performed in MCAV method while the optical disk, which has pre-recorded information provided thereon so as to permit rotation control at a constant linear velocity (CLV), is rotated at a constant angular velocity (CAV), one optical disk may be used both in CLV method as its original method and in MCAV method, as long as it is of recordable type, and in either case, the optical disk recording/reproducing device of the present invention may provide its reproducing operation.

Furthermore, for example, by reproducing a CD-ROM in MCAV method, which is fabricated so as to be reproduced in CLV method, since in MCAV method, the frequency of the reproduction clock increases as the relevant position gets closer to the circumferential section on the optical disk, reproducing speed as well as transfer rate to external devices is more heightened as the relevant position gets closer to the circumferential section, and consequently, required time for the reproduction as well as for the transfer operation may be shortened.

Accordingly, a highly reliable disk recording and/or reproducing device may be provided, wherein both large capacity for data characterized in CLV method and high speed operability characterized in CAV method are achieved.

Additionally, in all the above embodiments, the explanations are given following the example wherein the pre-recorded information is recorded by giving the transverse excursion to the guiding grooves corresponding to the bi-phase-mark modulated waves of the absolute addresses; however, the present invention is not limited to the method, and other modulating methods for limiting frequency band may be applicable. Further, the guiding grooves may be provided on a disk not by giving the transverse excursion thereto, but by giving a wobbling thereto.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical disk recording/reproducing device, which records or reproduces information on or from an optical disk, the optical disk having pre-recorded information cyclically provided along tracks so as to permit rotation control by using a constant linear velocity method for an entire region thereof, comprising:
    driving means for rotatively driving the optical disk at a constant angular velocity;
    reproducing means for reproducing information signals and the pre-recorded information provided on the optical disk;
    reference signal generation means for generating reference signals corresponding to a recording frequency of the reproduced pre-recorded information in the information signals reproduced by the reproducing means; and
    recording means for performing a recording operation by using a recording frequency in accordance with said reference signal generated by said reference signal generation means.

2. The optical disk recording/reproducing device as set forth in claim 1, wherein the pre-recorded information includes absolute addresses, each absolute address indicating a recording start position for each piece of information recorded on the optical disk, said absolute address being recorded by making a transverse excursion in guide grooves forming tracks on the optical disk which excursion forms a bi-phase-mark modulated wave during reproduction.

3. The optical disk recording/reproducing device as set forth in claim 1, wherein the pre-recorded information includes absolute addresses, each absolute address indicating a recording start position for each piece of information recorded on the optical disk, said absolute addresses being recorded by wobbling guide grooves forming tracks on the optical disk which wobbled guide grooves form bi-phase-mark modulated waves during reproduction.

4. An optical disk recording/reproducing device, which records or reproduces information on or from an optical disk, the optical disk having pre-recorded information cyclically provided along a track so as to permit rotation control by using a constant linear velocity method for an entire region thereof, comprising:
    driving means for rotatively driving the optical disk at a constant angular velocity;
    reproducing means for reproducing information signals and the pre-recorded information from the optical disk;
    reference signal generation means for generating a reference signal for reproduction corresponding to a recording frequency of the reproduced pre-recorded information in the information signals reproduced by the reproducing means; and
    a reproduced signal processing circuit for extracting cyclically a reproduced signal from the reproduced information signals according to a position of said reproducing means on the optical disk in a radial direction and in accordance with said reference signal.

5. The optical disk recording/reproducing device as set forth in claim 4, wherein said driving means is a spindle motor.

6. The optical disk recording/reproducing device as set forth in claim 4, wherein said reproducing means is an optical head for reproducing signals from the optical disk by directing a laser beam onto the optical disk and receiving a reflected beam therefrom.

7. The optical disk recording/reproducing device as set forth in claim 4, wherein said reference signal is a reproduction clock signal inputted to said reproduced signal processing circuit, and said reference signal generation means is a reproduction clock generating circuit.

8. The optical disk recording/reproducing device as set forth in claim 7, wherein said reproduction clock generating circuit comprises:
    a converter for generating a voltage according to a frequency of the pre-recorded information inputted thereto;
    a frequency divider;
    a phase comparison circuit to which said reproduced signal and a signal from the frequency divider are inputted;
    a low-pass filter to which a signal from the phase comparison circuit is inputted;

an adder for adding the voltage generated by said frequency/voltage converter and a voltage from said low-pass filter; and a voltage control oscillator for generating said reproduction clock signal according to a voltage from said adder and for generating a signal to control said frequency divider.

9. The optical disk recording/reproducing device as set forth in claim 7, wherein said reproduction clock generating circuit comprises:

a frequency divider;

a switching device for switching between a recording frequency of the reproduced signal and a frequency of an output signal from said frequency divider;

a first phase locked loop circuit including,
a first phase comparison circuit,
a first low-pass filter,
a first voltage controlled oscillator, and
a second frequency divider;

said first phase locked loop circuit having a signal from said switching device inputted thereto and generating therefrom said reproduction clock signal for said reproduced signal processing circuit; and a second phase locked loop circuit including,
a second phase comparison circuit,
a second low-pass filter,
a second voltage control led oscillator, and
a third frequency divider;

said second phase locked loop circuit having bi-phase-mark modulated waves inputted thereto and generating a signal for said first frequency divider, a dividing ratio of said first frequency divider being predeterminately set so that a frequency of an output of said first frequency divider is substantially equal to the recording frequency of the reproduced signal.

10. An optical disk recording/reproducing device, which records or reproduces information on or from an optical disk, the optical disk having pre-recorded information cyclically provided along a track so as to permit rotation control by a constant linear velocity method for an entire region thereof, comprising:

a spindle motor for rotatively driving the optical disk at a constant angular velocity;

an optical head for reproducing information signals and the pre-recorded information from the optical disk;

a pre-recorded information detection circuit for extracting only the pre-recorded information from the information signals reproduced by said optical head;

a reproduction clock generating circuit to which the extracted pre-recorded information and a reproduced signal from the optical head are inputted; and a reproduced signal processing circuit for extracting cyclically the reproduced signal in accordance with a reproduction clock signal generated by said reproduction clock generating circuit.

11. An optical disk recording/reproducing device, which records or reproduces information on or from an optical disk, the optical disk having pre-recorded information cyclically provided along a track so as to permit rotation control by a constant linear velocity method for an entire region thereof, comprising:

driving means for rotatively driving the optical disk at a constant angular velocity;

pre-recorded information reproducing means for reproducing pre-recorded information during a recording operation;

first reference signal generation means for generating a first reference signal, said first reference signal establishing a recording frequency according to a recording frequency of the pre-recorded information reproduced by said pre-recorded information reproducing means; and recording means for performing a recording operation by using the frequency of said first reference signal generated by said first reference signal generation means as the recording frequency.

12. The optical disk recording/reproducing device as set forth in claim 11 further comprising:

second reference signal generating means for generating a second reference signal, said second reference signal establishing recording conditions including at least light power for recording or intensity of a magnetic field for recording, said second reference signal being generated according to the pre-recorded information reproduced by said pre-recorded information reproducing means; and recording condition setting means for determining recording conditions according to said second reference signal and for outputting data corresponding to the determined recording conditions to said recording means.

13. The optical disk recording/reproducing device as set forth in claim 11 or claim 12, wherein said driving means is a spindle motor.

14. The optical disk recording/reproducing device as set forth in claim 11 or claim 12, wherein said first reference signal is a recording clock signal and said first reference signal generation means is a clock generating circuit for generating said recording clock signal.

15. The optical disk recording/reproducing device as set forth in claim 11 or claim 12, wherein said pre-recorded information reproducing means is an optical head for reproducing information from the optical disk by directing a laser beam onto the optical disk and by receiving a reflected beam therefrom.

16. The optical disk recording/reproducing device as set forth in claim 11 or claim 12, wherein said recording means comprises an optical head for directing a laser beam onto the optical disk and a magnetic coil for applying a magnetic field to the optical disk.

17. The optical disk recording/reproducing device as set forth in claim 12, wherein said second reference signal includes at least a magnetic field control signal or a recording light power control signal.

18. The optical disk recording/reproducing device as set forth in claim 17, wherein said second reference signal generation means comprises at least a magnetic field control circuit for generating said second reference signal generation means comprises at least a magnetic field control circuit for generating said magnetic field control signal or a recording light power control circuit for generating said recording light power control signal, and said recording condition setting means comprises at least said magnetic field control circuit or said recording light power control circuit.

19. The optical disk recording/reproducing device, which records or reproduces information on or from an optical disk, the optical disk having pre-recorded information cyclically provided along a track so as to permit rotation control by a constant linear velocity method for an entire region thereof, comprising:
- a spindle motor for rotatively driving the optical disk at a constant angular velocity;
- an optical head for directing a laser beam onto the optical disk during a recording operation and for reproducing the pre-recorded information during the recording operation;
- a pre-recorded information detection circuit for extracting the pre-recorded information from information signals reproduced by said optical head;
- a clock generating circuit for generating a recording clock signal, said recording clock signal establishing a recording frequency according to a recording frequency of the pre-recorded information inputted from said pre-recorded information detection circuit; and
- a magnetic coil for applying a magnetic field to the optical disk during a recording operation according to said recording clock signal generated by said clock generating circuit.

20. The optical disk recording/reproducing device as set forth in claim 19, wherein said clock generating circuit is a phase locked loop circuit having a phase comparator, a low-pass filter, a voltage controlled oscillator, and a frequency divider.

21. The optical disk recording/reproducing device as set forth in claim 19, wherein said clock generating circuit comprises:
- a converter for generating a voltage according to a frequency of the pre-recorded information inputted thereto; and
- a converter for generating a signal having a certain frequency as said recording clock signal according to said voltage generated by said frequency/voltage converter.

22. The optical disk recording/reproducing device as set forth in claim 19, wherein said clock generating circuit comprises:
- a frequency measuring section for counting a number of state changes of a synchronous clock signal, said synchronous clock signal being part of the pre-recorded information, in a predetermined unit of time;
- a translation table for generating a value signal corresponding to a frequency measured by said frequency measuring section; and
- a programmable oscillator for oscillating with a frequency according to said value signal so as to produce said recording clock signal.

23. The optical disk recording/reproducing device as set forth in claim 19, wherein said clock generating circuit comprises:
- a cycle measuring section for finding an average cycle by counting intervals between state changes of a synchronous clock signal, said synchronous clock signal being part of the pre-recorded information, based on a high-speed clock;
- a translation table for generating a value signal corresponding to a cycle measured by said cycle measuring section; and
- a programmable oscillator for oscillating with a frequency according to said value signal from said translation table so as to produce said recording clock signal.

24. The optical disk recording/reproducing device as set forth in claim 19 further comprising:
- a magnetic field control circuit for generating a magnetic field control signal which changes intensity of a magnetic field being applied to the optical disk during a recording operation, according to the reproduced pre-recorded information.

25. The optical disk recording/reproducing device as set forth in claim 24, wherein said magnetic field control circuit includes a frequency/voltage converter for generating said magnetic field control signal as a voltage having a value to form a magnetic field suitable for a disk speed in accordance with a frequency of the pre-recorded information inputted thereto.

26. The optical disk recording/reproducing device as set forth in claim 24, wherein said magnetic field control circuit comprises:
- an address decoder for generating an address value obtained by demodulating the pre-recorded information inputted thereto;
- a translation table for generating a control signal according to said address value; and
- a digital/analog converter for converting the control signal from a digital to an analog signal, said analog signal being said magnetic field control signal.

27. The optical disk recording/reproducing device as set forth in claim 19 further comprising:
- a recording light power control circuit for generating a light power control signal which changes intensity of light power being applied to the optical disk during a recording operation, according to the reproduced pre-recorded information.

28. The optical disk recording/reproducing device as set forth in claim 27, wherein said recording light power control circuit includes a frequency/voltage converter for generating a voltage according to a frequency of the pre-recorded information inputted thereto as said light power control signal.

29. The optical disk recording/reproducing device as set forth in claim 27, wherein said recording light power control circuit comprises:
- an address decoder for generating an address value obtained by demodulating the pre-recorded information inputted thereto;
- a translation table for generating a control signal according to said address value; and
- a digital/analog converter for converting said control signal from a digital to an analog signal, said analog signal being said light power control signal.

30. A method for an optical disk recording/reproducing device which controls accessing an optical disk having pre-recorded information cyclically provided along a track thereon so as to permit rotation control by a constant linear velocity method, while providing rotation control at a constant angular velocity, comprising the steps of:
- (a) reproducing information while rotating the optical disk at a the constant angular velocity;
- (b) switching an output signal from a frequency divider to a first phase comparison circuit where pre-recorded information is inputted after having started an access operation to access a desired piece of pre-recorded information;
- (c) judging whether the access operation has been completed; and
- (d) switching a reproduced signal as an input signal to the first phase comparison circuit, which is reproduced by an optical head, when the access operation has been completed.

31. A method for an optical disk recording/reproducing device which records information at a constant angular velocity on an optical disk having pre-recorded information cyclically provided along tracks thereon so as to permit rotation control by a constant linear velocity, comprising the steps of:

(a) rotating the optical disk at a the constant angular velocity;

(b) extracting pre-recorded information from information signals obtained by reproducing information from the optical disk;

(c) detecting a recording frequency of the pre-recorded information;

(d) generating a recording clock signal from the detected recording frequency; and (e) writing information by using the recording clock signal.

32. The method as set forth in claim 31 further comprising the steps of:

(f) generating control signals for determining recording conditions according to the reproduced pre-recorded information;

(g) controlling an intensity of a magnetic field being applied to the optical disk; and (h) controlling a light power being applied to the optical disk.

* * * * *